US012476459B2

United States Patent
Wang et al.

(10) Patent No.: US 12,476,459 B2
(45) Date of Patent: Nov. 18, 2025

(54) METHOD AND DEVICE FOR CALCULATING FAULT MEASUREMENT IMPEDANCE OF HYBRID-CONNECTED GRID-FOLLOWING AND GRID-FORMING WIND POWER SYSTEM

(71) Applicant: North China Electric Power University, Beijing (CN)

(72) Inventors: Tong Wang, Beijing (CN); Zengping Wang, Beijing (CN); Shuwei He, Beijing (CN)

(*) Notice: Subject to any disclaimer, the term of this patent is extended or adjusted under 35 U.S.C. 154(b) by 0 days.

(21) Appl. No.: 19/196,733

(22) Filed: May 1, 2025

(65) Prior Publication Data

US 2025/0260228 A1  Aug. 14, 2025

Related U.S. Application Data

(63) Continuation of application No. PCT/CN2025/082791, filed on Mar. 16, 2025.

(30) Foreign Application Priority Data

Aug. 12, 2024  (CN) .......................... 202411096319.9

(51) Int. Cl.
- *H02J 3/00* (2006.01)
- *G01R 27/16* (2006.01)
- *H02J 3/38* (2006.01)

(52) U.S. Cl.
CPC ............ *H02J 3/0012* (2020.01); *G01R 27/16* (2013.01); *H02J 3/381* (2013.01); *H02J 2203/20* (2020.01); *H02J 2300/28* (2020.01)

(58) Field of Classification Search
CPC ...... H02J 3/0012; H02J 3/381; H02J 2203/20; H02J 2300/28; G01R 27/16
See application file for complete search history.

(56) References Cited

U.S. PATENT DOCUMENTS

| 6,566,764 B2 * | 5/2003 | Rebsdorf ............. F03D 7/0284 290/55 |
| 2010/0157632 A1 * | 6/2010 | Batten ................. H02M 7/4807 363/74 |

(Continued)

FOREIGN PATENT DOCUMENTS

| CN | 104852375 A | 8/2015 |
| CN | 107591785 A | 1/2018 |

(Continued)

OTHER PUBLICATIONS

Chinese patent CN118410263A to Yingjie Qin et al., published Jul. 30, 2024, English translation, 41 pages.
Chinese patent CN114997505A to Le Zheng et al., published Sep. 2, 2022, English translation, 30 pages.
Chinese patent CN11423748A to Wang Zhi et al., published Mar. 25, 2022, English translation, 28 pages.

(Continued)

*Primary Examiner* — Ziaul Karim
(74) *Attorney, Agent, or Firm* — Addison D. Ault; IPGentleman Intellectual Property Services, LLC

(57) ABSTRACT

The present disclosure provides a method and device for calculating fault measurement impedance of a hybrid-connected grid-following and grid-forming wind power system. The method includes: obtaining characteristics of the grid-following and grid-forming converters and a corresponding low voltage ride-through control strategy; establishing an equivalent circuit under a corresponding fault state; conducting a simplified analysis on the wind power system to obtain an equivalent network diagram; obtaining a sub-circuit diagram of each power source excitation acting alone; obtaining short-circuit currents on both sides of the corresponding system and a grid connection point voltage; superimposing to obtain total short-circuit current on both sides of the wind power system and total grid connection point voltage; and obtaining a measurement impedance at a protection installation location on the new energy source side. The method can accurately calculate the measurement (Continued)

impedance value at the protection installation location after the wind power system has fault.

9 Claims, 12 Drawing Sheets

(56) References Cited

U.S. PATENT DOCUMENTS

| | | | |
|---|---|---|---|
| 2010/0157638 A1* | 6/2010 | Naiknaware | H02M 7/4807 363/131 |
| 2017/0077700 A1 | 3/2017 | Sun et al. | |
| 2018/0177032 A1* | 6/2018 | Recker | H05B 45/20 |
| 2020/0083715 A1* | 3/2020 | Yoscovich | H02J 3/381 |
| 2022/0137118 A1* | 5/2022 | Holliday, III | H02J 3/001 324/522 |
| 2023/0327456 A1* | 10/2023 | Farb | F03B 15/00 |

FOREIGN PATENT DOCUMENTS

| | | |
|---|---|---|
| CN | 113949092 A | 1/2022 |
| CN | 114243748 A | 3/2022 |
| CN | 114997505 A | 9/2022 |
| CN | 118410263 A | 7/2024 |

OTHER PUBLICATIONS

Chinese patent CN113949092A to Dongdong Li et al., published Jan. 18, 2022, English translation, 36 pages.

Chinese patent CN104852375A to Songtai Yu et al., published Aug. 18, 2015, English translation, 25 pages.

CNIPA Application No. 202411096319.9 First Office Action dated Jan. 5, 2025, Original Chinese, pp. 1-9.

CNIPA Application No. 202411096319.9 First Office Action dated Jan. 5, 2025, English translation, pp. 1-18.

* cited by examiner obtaining characteristics of the grid-following and grid-forming converters and a corresponding low voltage ride-through control strategy under a fault state establishing an equivalent circuit under a corresponding fault state conducting a simplified analysis on the hybrid-connected grid-following and grid-forming wind power system, and obtaining an equivalent network diagram under the corresponding fault state analyzing the equivalent network diagram to obtain a sub-circuit diagram of each power source excitation acting alone analyzing the sub-circuit diagram corresponding to each power source excitation, and obtaining short-circuit currents on a system side and a new energy source side and a grid connection point voltage when each power source excitation acts alone superimposing short-circuit currents on two sides corresponding to various power source excitations respectively, to obtain total short-circuit current on the two sides in the hybrid-connected system; superimposing grid connection point voltages corresponding to various power source excitations, to obtain a total grid connection point voltage of the hybrid-connected system obtaining a measurement impedance at a protection installation location on the new energy source side by calculating, based on the total short-circuit current on the system side and the new energy source side in the hybrid-connected grid-following and grid-forming wind power system

FIG. 1

(a) Schematic view of grid-following/grid-forming hybrid transmission system (b) Equivalent transmission system analysis model

METHOD AND DEVICE FOR CALCULATING FAULT MEASUREMENT IMPEDANCE OF HYBRID-CONNECTED GRID-FOLLOWING AND GRID-FORMING WIND POWER SYSTEM

CROSS-REFERENCE TO RELATED APPLICATION

This application is US Utility continuation application claiming priority to International Application No. PCT/CN2025/082791, filed on Mar. 16, 2025, entitled "Method and Device for Calculating Fault Measurement Impedance of Hybrid-Connected Grid-Following and Grid-Forming Wind Power System", which claims priority to Chinese Application No. 202411096319.9, filed on Aug. 12, 2024, incorporated herein by reference in their entirety.

TECHNICAL FIELD

The present disclosure relates to the technical field of fault analysis of new energy source systems, and in particular to a method and device for calculating fault measurement impedance of a hybrid-connected grid-following and grid-forming wind power system.

BACKGROUND

At present, most new energy power systems adopt grid-following grid-connected control, especially in remote areas with abundant wind and light resources, and wind power stations, photovoltaic power stations and other scenes that are gradually being built. However, due to the large volatility of new energy power systems such as wind power generation and photovoltaic power generation, problems such as insufficient system support capacity, voltage and frequency stability under weak power grids continue to emerge. Therefore, grid-forming new energy with independent support capacity is gradually involved in the construction of power grid, thus forming a hybrid-connected grid-following and grid-forming wind power system that combines grid-following grid-connected control and grid-forming grid-connected control.

SUMMARY

In order to overcome the above-mentioned deficiencies of the prior art, the present disclosure provides a method and device for calculating fault measurement impedance of a hybrid-connected grid-following and grid-forming wind power system, which specifically adopt the following technical solutions:

The present disclosure discloses a method for calculating fault measurement impedance of a hybrid-connected grid-following and grid-forming wind power system, wherein the hybrid-connected grid-following and grid-forming wind power system comprises at least a grid-following converter and a grid-forming converter, and the method comprises following steps:

obtaining characteristics of the grid-following and grid-forming converters in a power grid and a corresponding low voltage ride-through control strategy under a fault state;

establishing an equivalent circuit under a corresponding fault state according to the characteristics of the grid-following and grid-forming converters and the low voltage ride-through control strategy;

conducting a simplified analysis on the hybrid-connected grid-following and grid-forming wind power system according to the equivalent circuit, and obtaining an equivalent network diagram under the corresponding fault state;

analyzing the equivalent network diagram to obtain a sub-circuit diagram of each power source excitation acting alone; the power source excitation at least comprises a grid-forming voltage source, a grid-following current source, and a system-side voltage source;

analyzing the sub-circuit diagram corresponding to each power source excitation, and obtaining short-circuit currents on a system side and a new energy source side and a grid connection point voltage when each power source excitation acts alone;

superimposing short-circuit currents on the system side and the new energy source side corresponding to various power source excitations respectively, to obtain total short-circuit current on the system side and the new energy source side in the hybrid-connected grid-following and grid-forming wind power system; superimposing grid connection point voltages corresponding to various power source excitations, to obtain a total grid connection point voltage of the hybrid-connected grid-following and grid-forming wind power system; and obtaining a measurement impedance at a protection installation location on the new energy source side by calculating, based on the total short-circuit current on the system side and the new energy source side in the hybrid-connected grid-following and grid-forming wind power system.

Optionally, the corresponding low voltage ride-through control strategy under the fault state comprises a low voltage ride-through control strategy of the grid-forming converter; the low voltage ride-through control strategy of the grid-forming converter comprises steps:

adjusting an active power reference value of a virtual synchronous generator from $P_{ref}$ to $P_e$, and keeping a power angle of the virtual synchronous generator stable during a fault period, wherein a change $\Delta\delta$ of the power angle of the virtual synchronous generator during the fault period is:

$$\Delta\delta = \int \Delta\omega dt = \frac{P_{ref} - P_e}{D\omega_n}\left(t + \frac{J}{D}e^{-\frac{D}{J}t} - \frac{J}{D}\right);$$

by switching a virtual internal potential amplitude reference value and a reactive power reference value of the virtual synchronous generator, limiting the short-circuit current and providing a reactive support to the hybrid-connected grid-following and grid-forming wind power system, wherein the virtual internal potential amplitude reference value of the virtual synchronous generator switched during the fault period is:

$$E_{ref} = \frac{-a \pm \sqrt{a^2 - 4b}}{2};$$

wherein a is a first calculated intermediate value, and a is obtained by a first intermediate value calculation formula, and the first intermediate value calculation formula is:

$$a = -\frac{u_{gf}(E_0^2 + U_{g0}^2 - |Z_{eq}|^2 I_0^2)}{E_0 U_{g0}};$$

wherein b is a second calculated intermediate value, and b is obtained by a second intermediate value calculation formula, and the second intermediate value calculation formula is:

$$b = u_{gf}^2 - |Z_{eq}|^2 I_{gf}^2;$$

wherein, $\Delta\omega$ is a rate of change of virtual rotation angular velocity of the virtual synchronous generator; $P_{ref}$ is an active power reference value of the virtual synchronous generator; $P_e$ is an output active power of the virtual synchronous generator; D is a virtual damping coefficient; J is a virtual moment of inertia; $\omega_s$ is a rated value of grid frequency; $E_0$ is an internal potential of the virtual synchronous generator before fault; $U_{g0}$ is a grid voltage before fault; $I_0$ is a rated output current of the virtual synchronous generator; $E_{ref}$ is an internal potential reference value of the virtual synchronous generator during fault; $u_{gf}$ is a voltage amplitude of fault phase of the grid; $I_{gf}$ is a fault steady-state current limit threshold of the virtual synchronous generator; $Z_{eq}$ is an equivalent total impedance of a virtual synchronous generator grid-connected system;

wherein when a fault occurs, a virtual impedance link is put into operation to perform short-circuit current limiting control and increase an equivalent output impedance of the virtual synchronous generator to suppress a short-circuit instantaneous large current impact of the virtual synchronous generator during the fault.

Optionally, the corresponding low voltage ride-through control strategy under the fault state comprises a low voltage ride-through control strategy of the grid-following converter; the low voltage ride-through control strategy of the grid-following converter comprises steps:

according to a drop degree of the grid connection point voltage after the fault, setting current reference values of a direct axis d and a quadrature axis q of a current inner loop as follows:

$$\begin{cases} I_{dref} = \min\left(\sqrt{I_{max}^2 - I_{qref}^2}, \frac{2P_{ref}}{3U_0}\right) \\ I_{qref} = \begin{cases} 0 & U_0 \geq 0.9 \text{ p.u.} \\ 1.5*(0.9 - U_0)I_n & 0.2 \text{ p.u.} \leq U_0 \leq 0.9 \text{ p.u.} \\ 1.05 I_n & U_0 \leq 0.2 \text{ p.u.} \end{cases} \end{cases};$$

wherein, $I_{dref}$ is a current reference value in a direct axis d coordinate system; $I_{qref}$ is a current reference value in a quadrature axis q coordinate system; $P_{ref}$ is an active power reference value; $U_0$ is a grid connection point voltage; $I_{max}$ is a maximum limiting current of the grid-following converter; $I_n$ is a rated current; p.u. is a per unit value;

according to a current carrying capacity of power electronic equipment in the hybrid-connected grid-following and grid-forming wind power system, setting a limiting control for a PI link of a current inner loop controller, wherein the maximum current limiting amplitude is 1.2~2 times of the rated current.

Optionally, the hybrid-connected grid-following and grid-forming wind power system comprises m grid-forming converters and n grid-following converters; when a fault occurs, the m grid-forming converters are equivalent to m voltage source $E_s$ nodes with series equivalent output impedance $Z_{s1}$, and the n grid-following converters are equivalent to n current source $I_{s1}$ nodes controlled by the grid connection point voltage;

when the equivalent circuit process under the corresponding fault state is established, the m voltage source nodes are equivalent to a branch of a voltage source $E_s$ and an equivalent output impedance $Z_1$ in series, and an equivalent voltage source model of the corresponding branch is:

$$\begin{cases} E_s = E_{ref} \\ Z_1 = Z_{s1}/m \end{cases};$$

where $E_s$ is an output potential of an equivalent voltage source; $E_{ref}$ is an internal potential reference value of the virtual synchronous generator during the fault; $Z_1$ is an equivalent output impedance value; $Z_{s1}$ is an equivalent output impedance value corresponding to a single voltage source node;

wherein n current source nodes are equivalent to a current source Is branch, and the equivalent current source model of the corresponding branch is:

$$\begin{cases} I_s = nI_{s1} \\ I_{s1} = \sqrt{I_{dref}^2 + I_{qref}^2} = F(U_0) \\ \delta_s = \arctan\sqrt{I_{qref}/I_{dref}} \end{cases};$$

wherein $I_S$ is an amplitude of the short-circuit current output by the current source in the equivalent circuit; $I_{S1}$ is an amplitude of the short-circuit current output corresponding to a single current source; $\delta_S$ is a phase angle of the short-circuit current output by the current source in the equivalent circuit; $I_{dref}$ and $I_{qref}$ are current reference values in the direct axis d and quadrature axis q coordinate systems respectively; $U_0$ is the grid connection point voltage.

Optionally, the short-circuit currents on the system side and the new energy source side and the grid connection point voltage when the grid-forming voltage source acts alone, are:

$$\begin{cases} \dot{U}_0 = \frac{Z_{eq3} + Z_{eq4}//R_g}{Z_{eq1} + Z_{eq3} + Z_{eq4}//R_g}\dot{E}_s \approx \frac{Z_{eq3}}{Z_{eq1} + Z_{eq3}}\dot{E}_s \\ \dot{I}_M = \frac{\dot{E}_s}{Z_{eq1} + Z_{eq3} + Z_{eq4}//R_g} \approx \frac{\dot{E}_s}{Z_{eq1} + Z_{eq3}} \\ \dot{I}_N = -\frac{R_g}{R_g + Z_{eq4}} * \frac{\dot{E}_s}{Z_{eq1} + Z_{eq3} + Z_{eq4}//R_g} \approx \frac{R_g}{Z_{eq4}*(Z_{eq3} + Z_{eq3})}\dot{E}_s \end{cases};$$

where, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{E}_S$ is an internal potential of a grid-forming equivalent voltage source; $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-forming station transmission line impedance; $Z_{MN}$ is a high-voltage side transmission line impedance; $\alpha$ is a fault location coefficient; $R_g$ is a transition resistance; $Z_{s3}$ is an internal resistance of a system side power source; $Z_{eq4}//R_g$ is a total resistance value calculated after $Z_{eq4}$ is in a parallel connection with $R_g$.

Optionally, the short-circuit currents on the system side and the new energy source side and the grid connection point voltage when the grid-following voltage source acts alone, are:

$$\begin{cases} \dot{U}_0 = \dfrac{Z_{eq1} * (Z_{eq3} + Z_{eq1}//R_g)}{Z_{eq1} + Z_{eq3} + Z_{eq4}//R_g} \dot{I}_s \approx \dfrac{Z_{eq1} Z_{eq3}}{Z_{eq1} + Z_{eq3}} \dot{I}_s \\ \dot{I}_N = -\dfrac{R_g}{R_g + Z_{eq4}} * \dfrac{Z_{eq1}}{Z_{eq1} + Z_{eq3} + Z_{eq4}//R_g} \dot{I}_s \approx -\dfrac{R_g Z_{eq1}}{Z_{eq4}(Z_{eq1} + Z_{eq3})} \dot{I}_s \\ \dot{I}_M = \dfrac{Z_{eq1}}{Z_{eq1} + Z_{eq3} + Z_{eq4}//R_g} \dot{I}_s \approx \dfrac{Z_{eq1}}{Z_{eq1} + Z_{eq3}} \dot{I}_s \end{cases}$$

wherein, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $I_S$ is an output current of the grid-following equivalent current source $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source; $Z_{eq4}//R_g$ is a total resistance value calculated after $Z_{eq4}$ is in a parallel connection with $R_g$.

Optionally, the short-circuit currents on the system side and the new energy source side and the grid connection point voltage when the system-side voltage source acts alone, are:

$$\begin{cases} \dot{U}_0 = \dfrac{Z_{eq1} * R_g}{(Z_{eq1} + Z_{eq3}) * R_g + (Z_{eq1} + Z_{eq3} + R_g) * Z_{eq4}} \dot{U} \approx \dfrac{Z_{eq1} * R_g}{(Z_{eq1} + Z_{eq3}) * Z_{eq4}} \dot{U} \\ \dot{I}_N = -\dfrac{\dot{U}}{Z_{eq4} + (Z_{eq1} + Z_{eq3})//R_g} \approx -\dfrac{\dot{U}}{Z_{eq4}} \\ \dot{I}_M = \dfrac{\dot{U} * R_g}{(Z_{eq1} + Z_{eq3} + R_g) * Z_{eq4} + (Z_{eq1} + Z_{eq3}) * R_g} \approx \dfrac{\dot{U} * R_g}{(Z_{eq1} + Z_{eq3}) * Z_{eq4}} \end{cases}$$

wherein, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{U}$ is an internal potential of a system side power source $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source; $(Z_{eq1}+Z_{eq3})//R_g$ is a total resistance value calculated after $Z_{eq1}$ and $Z_{eq3}$ are connected in parallel with $R_g$.

Optionally, the total short-circuit current on the system side and the new energy source side and the total grid connection point voltage in the of the hybrid-connected grid-following and grid-forming wind power system, obtained by superimposing the various power source excitations, are:

$$\begin{cases} \dot{U}_0 = \dfrac{Z_{eq3} Z_{eq4} \dot{E}_s + Z_{eq1} R_g \dot{U} + Z_{eq1} Z_{eq3} Z_{eq4} \dot{I}_s}{(Z_{eq1} + Z_{eq3}) * Z_{eq4}} \\ \dot{I}_M = \dfrac{Z_{eq4} \dot{E}_s + R_g \dot{U} + Z_{eq1} Z_{eq4} \dot{I}_s}{(Z_{eq1} + Z_{eq3}) * Z_{eq4}} \\ \dot{I}_N = -\dfrac{R_g \dot{E}_s + (Z_{eq1} + Z_{eq3}) \dot{U} + R_g Z_{eq3} \dot{I}_s}{Z_{eq4}(Z_{eq1} + Z_{eq3})} \end{cases};$$

wherein, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{E}_S$ is an internal potential of a grid-forming equivalent voltage source; $\dot{I}_S$ is an output current of the grid-following equivalent current source; $\dot{U}$ is an internal potential of a system side power source; $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source.

Optionally, the step of obtaining a measurement impedance at a protection installation location on the new energy source side by calculating, based on the total short-circuit current on the system side and the new energy source side in the hybrid-connected grid-following and grid-forming wind power system, comprises:

$$Z_m = \dfrac{\dot{U}_m}{\dot{I}_m} = Z_{eq3} + \dfrac{\dot{I}_M + \dot{I}_N}{\dot{I}_M} R_g = Z_{eq3} + \Delta Z = Z_{eq3} + R_g + \dfrac{R_g \dot{E}_S + (Z_{eq1} + Z_{eq3}) \dot{U} + R_g Z_{eq1} \dot{I}_S}{Z_{eq4} \dot{E}_S + R_g \dot{U} + Z_{eq1} Z_{eq4} \dot{I}_S} R_g;$$

where, $\dot{U}_m$ is a measurement voltage at the protection installation location on the new energy source side; $\dot{I}_m$ is a measurement current at the protection installation location on the new energy source side; $\dot{I}_M$ is a fault short-circuit current on the new energy source side; $\dot{I}_N$ is a fault short-circuit current on the system side; $\dot{E}_S$ is an internal potential of the grid-forming equivalent voltage source; $\dot{I}_S$ is an output current of the grid-following equivalent current source; $\dot{U}$ is an internal potential of the system side power source; $Z_{eq1}=Z_1+Z_L$, $Z_{eq3}=\alpha Z_{MN}$, $Z_{eq4}=(1-\alpha)Z_{MN}+Z_{s3}$; $Z$ is a grid-forming equivalent output impedance; $Z_L$ is a grid-following station transmission line impedance; $Z_{MN}$ is a high-voltage side transmission line impedance; $\Delta Z$ is an additional impedance; $\alpha$ is a fault location coefficient; $R_g$ is a transition resistance; $Z_{s3}$ is an internal resistance of the system side power source.

The present disclosure further provides a device for calculating fault measurement impedance of a hybrid-connected grid-following and grid-forming wind power system, comprising:

a state acquisition assembly, configured for obtaining characteristics of the grid-following and grid-forming converters in a power grid and a corresponding low voltage ride-through control strategy under a fault state;

an equivalent circuit construction assembly, configured for establishing an equivalent circuit under a corresponding fault state according to the characteristics of the grid-following and grid-forming converters and the low voltage ride-through control strategy;

a simplified analysis assembly, configured for conducting a simplified analysis on the hybrid-connected grid-following and grid-forming wind power system according to the equivalent circuit, and obtaining an equivalent network diagram under the corresponding fault state;

an equivalent network analysis assembly, configured for analyzing the equivalent network diagram to obtain a sub-circuit diagram of each power source excitation acting alone; the power source excitation at least comprises a grid-forming voltage source, a grid-following current source, and a system-side voltage source;

a power source excitation analysis assembly, configured for analyzing the sub-circuit diagram corresponding to each power source excitation, and obtaining short-circuit currents on a system side and a new energy source side and a grid connection point voltage when each power source excitation acts alone;

a superposition analysis assembly, configured superimposing short-circuit currents on the system side and the new energy source side corresponding to various power source excitations respectively, to obtain total short-circuit current on the system side and the new energy source side in the hybrid-connected grid-following and grid-forming wind power system; and superimposing grid connection point voltages corresponding to various power source excitations, to obtain a total grid connection point voltage of the hybrid-connected grid-following and grid-forming wind power system; and an impedance output assembly, configured for obtaining a measurement impedance at a protection installation location on the new energy source side by calculating, based on the total short-circuit current on the system side and the new energy source side in the hybrid-connected grid-following and grid-forming wind power system.

BRIEF DESCRIPTION OF THE DRAWINGS

FIG. 1 is a schematic flow chart of a fault analysis method of a hybrid-connected grid-following and grid-forming wind power system in an embodiment of the present disclosure.

DETAILED DESCRIPTION OF EMBODIMENTS

Figure 2:
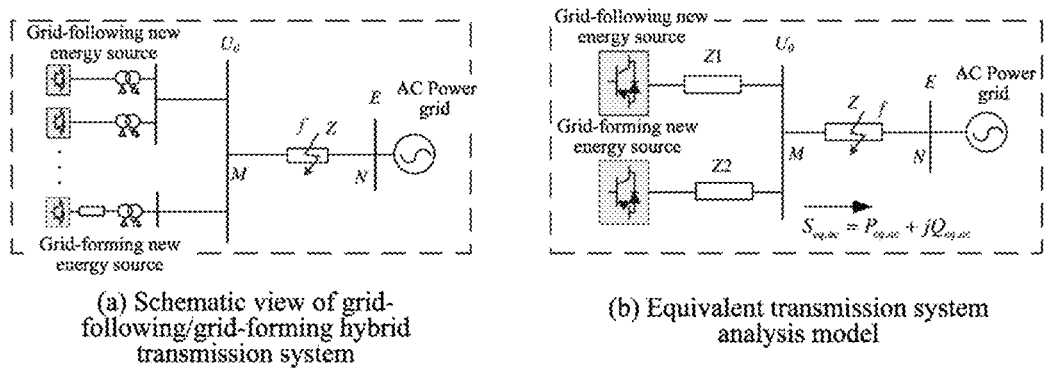
FIG. 2 is a diagram of an analysis model of a grid connection transmission line of a hybrid-connected grid-following and grid-forming wind power system in an embodiment of the present disclosure.

The embodiments of the present disclosure will be clearly and completely described below in conjunction with the drawings in the embodiments of the present disclosure. Obviously, the described embodiments are part of the present disclosure, rather than all of the embodiments. Therefore, those of ordinary skill in the art should recognize that various changes and modifications can be made to the embodiments described here without departing from the scope and spirit of the present disclosure. Similarly, for the sake of clarity and conciseness, the description of well-known functions and structures is omitted in the following description. Based on the embodiments in the present disclosure, all other embodiments obtained by those of ordinary skill in the art without making creative work are within the scope of protection of the present disclosure.

Due to the differences in control structures between different wind turbines, the hybrid-connected grid-following and grid-forming wind power system has complex stability problems in time and space. At the same time, due to the different fault ride-through control strategies adopted by different types of units, the short-circuit current calculation methods of grid-following converters and grid-forming converters in different operating environments after the fault are different. In addition, in different scenarios of new energy transmission systems, the highly power-electronic new energy power generation equipment interacts complexly with the dynamic characteristics of the system. At the same time, affected by the short-circuit current tolerance capability of power electronic devices and the system strength, the weak feedback characteristics of new energy are further amplified, and the short-circuit current on both sides of the system has great differences in amplitude and phase angle. With the increase in the capacity of grid-connected new energy and the complex actual working conditions, the topological structure of the transmission system has changed greatly, making it difficult to analyze the fault characteristics of the entire new energy source system, and it is difficult for traditional distance protection calculation methods to accurately calculate the short-circuit current of the hybrid-connected grid-following and grid-forming wind power system. Therefore, there is an urgent need for a method that can analyze the measurement impedance of a hybrid-connected grid-following and grid-forming wind power system that includes a grid-following converter and a grid-forming converter, so as to accurately solve the measurement impedance of the hybrid-connected grid-following and grid-forming wind power system and then correctly show short-circuit faults, in the hope of ensuring the safe and stable operation of the new energy source system.

The present disclosure achieves the following beneficial effects:

The calculation method disclosed in the present disclosure analyzes the characteristics of the grid-following converter and the grid-forming converter in the hybrid-connected grid-following and grid-forming wind power system, respectively establishes the equivalent circuits of the grid-following converter and the grid-forming converter, and establishes the equivalent network diagram of the hybrid-connected grid-following and grid-forming wind power system based on the analysis of each equivalent circuit, and solves the various state quantities on both sides of the system after the fault based on the superposition theorem, and then solves the measurement impedance at the protection installation on the new energy source side. The calculation method can accurately calculate the short-circuit current on both sides of the hybrid-connected grid-following and grid-forming wind power system after the fault, so as to further solve the measurement impedance value at the protection installation. The result error between the calculated value obtained by this method and the actual measured value does not exceed 3%, which ensures the setting calculation of the distance protection, can accurately reflect the fault characteristic information of the hybrid-connected grid-following and grid-forming wind power system, and provide a basis for the study of the applicability of the distance protection of the hybrid-connected grid-following and grid-forming wind power system, and ensure the safe and stable operation of the new energy source system.

As shown in FIG. 2 (a), it is a schematic diagram of the transmission line of the hybrid-connected grid-following and grid-forming wind power system in the embodiment of the present disclosure. In the embodiment of the present disclosure, the grid-following new energy station adopts a wind power station or a photovoltaic station, and the grid-forming new energy station adopts virtual synchronous generator control. The grid-following new energy station and the grid-forming new energy station are both connected to the transmission line through a transformer. The AC system on the right is an infinite power source, and the AC system is a weak system. In the embodiment of the present disclosure, a three-phase short circuit fault is set on the transmission line, and the line is grounded through a transition resistor. In addition, in order to further simplify the calculation, the present disclosure ignores the mutual influence between the new energy units. After the transmission line model of the hybrid-connected grid-following and grid-forming wind power system in FIG. 2 (a) is equivalently simplified, the equivalent transmission system analysis model of the hybrid-connected grid-following and grid-forming wind power system in FIG. 2 (b) can be obtained. The embodiment of the present disclosure uses the equivalent transmission system analysis model of the hybrid-connected grid-following and grid-forming wind power system for analysis and calculation.

Figure 3:
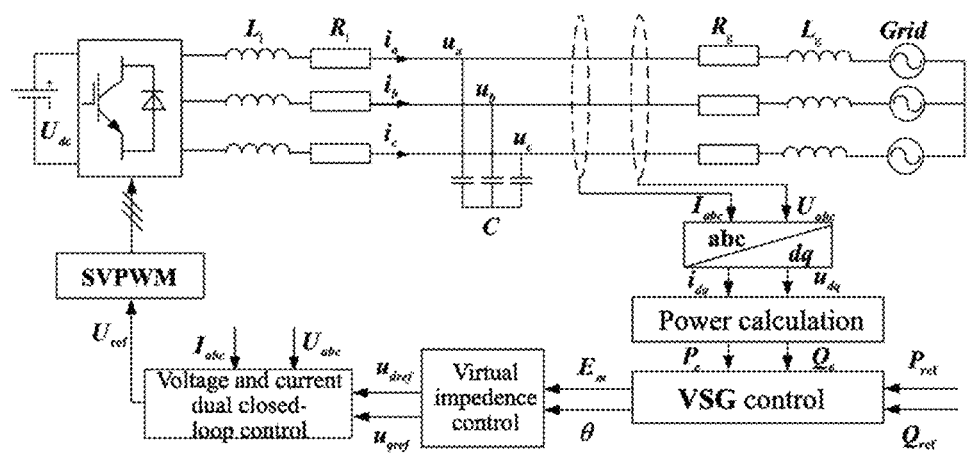
FIG. 3 is a main circuit and control block diagram of a grid-forming converter in an embodiment of the present disclosure.

Specifically, as shown in FIG. 1, the embodiment of the present disclosure discloses a method for calculating the fault measurement impedance of a hybrid-connected grid-following and grid-forming wind power system, wherein the hybrid-connected grid-following and grid-forming wind power system comprises at least a grid-following converter and a grid-forming converter, and the method comprises the following steps:

Step 1: obtaining characteristics of the grid-following and grid-forming converters in a power grid and a corresponding low voltage ride-through control strategy under a fault state. Analyze the Characteristics of Grid-Forming Converters and the Low Voltage Ride-Through Control Strategy:

In the embodiment of the present disclosure, a grid-forming converter controlled by virtual synchronous generator and operated in grid connection is analyzed. It adopts decoupling control in the dq coordinate system, and its control mainly includes three parts: virtual synchronous generator control, virtual impedance control, and voltage and current dual closed-loop control. Correspondingly, the main circuit and control block diagram of the grid-forming converter are shown in FIG. 3. Among them, the virtual synchronous generator control provides damping and inertia for the system through active-frequency control and reactive-voltage control, and achieves synchronization by constructing the potential amplitude and phase angle through its own output power. Virtual impedance control simulates the stator impedance by introducing a virtual impedance link, which equivalently increases the equivalent impedance of the system and improves the current limiting capacity of the converter. Finally, the voltage and current dual closed-loop control tracks and controls the current through the voltage and current dual closed-loop of dual PI control, and achieves control by modulating the generated voltage signal through PWM modulation.

When a fault occurs, the low voltage ride-through control strategy of the grid-forming converter is: adjust the active power reference value of the virtual synchronous generator from $P_{ref}$ to $P_e$, so that the virtual synchronous generator power angle is maintained stable during the fault; and by switching the virtual internal potential amplitude reference value and reactive power reference value of the virtual synchronous generator, it can provide a certain reactive power support for the system while limiting the short-circuit current. Specifically, the power angle change of the virtual synchronous generator during the fault is shown in formula (1), and the switched internal potential amplitude reference value is shown in formula (2):

$$\Delta\delta = \int \Delta\omega dt = \frac{P_{ref} \to P_e}{D\omega_n}\left(t + \frac{J}{D}e^{-\frac{D}{J}t} - \frac{J}{D}\right); \quad (1)$$

$$E_{ref} = \frac{-a \pm \sqrt{a^2 - 4b}}{2}; \quad (2)$$

Wherein a is the first calculated intermediate value, and a is obtained by the first intermediate value calculation formula, and the first intermediate value calculation formula is:

$$a = -\frac{u_{gf}(E_0^2 + U_{g0}^2 - |Z_{eq}|^2 I_0^2)}{E_0 U_{g0}};$$

Wherein b is the second calculated intermediate value, and b is obtained by the second intermediate value calculation formula, and the second intermediate value calculation formula is:

$$b = u_{gf}^2 - |Z_{eq}|^2 I_{gf}^2;$$

Wherein, Δω is the rate of change of virtual rotation angular velocity of the virtual synchronous generator; $P_{ref}$ is the active power reference value of the virtual synchronous generator; $P_e$ is the output active power of the virtual synchronous generator; D is the virtual damping coefficient; J is the virtual moment of inertia; On is the rated value of grid frequency; $E_0$ is the internal potential of the virtual synchronous generator before fault; $U_{g0}$ is the grid voltage before fault; $I_0$ is the rated output current of the virtual synchronous generator; Eres is the internal potential reference value of the virtual synchronous generator during fault; $u_{gf}$ is the voltage amplitude of the fault phase of the grid; $I_{gf}$ is the fault steady-state current limit threshold of the virtual synchronous generator, which is generally 1.3 $I_0$ in this embodiment; $Z_{eq}$ is the equivalent total impedance of the virtual synchronous generator grid-connected system.

In addition, in the embodiment of the present disclosure, a virtual impedance link is introduced when a fault occurs, to perform short-circuit current limiting control (generally taking $I_{max}=1.3\ I_0$), thereby increasing the equivalent output impedance of the virtual synchronous generator to suppress a short-circuit instantaneous large current impact of the virtual synchronous generator during the fault. During an asymmetric fault in the power grid in the embodiment of the present disclosure, it constructs a 90° phase shift link through positive and negative sequence separation control, and uses a double generalized integrator to filter out the double frequency fluctuation components of the positive and negative sequence dq components of the voltage and current in the opposite rotating coordinate system, thereby obtaining the dq DC components in each rotating coordinate system. Based on the above foundation, the embodiment of the present disclosure achieves control under different objectives by adjusting the negative sequence current reference value in the negative sequence loop of the virtual synchronous generator.

Figure 4:
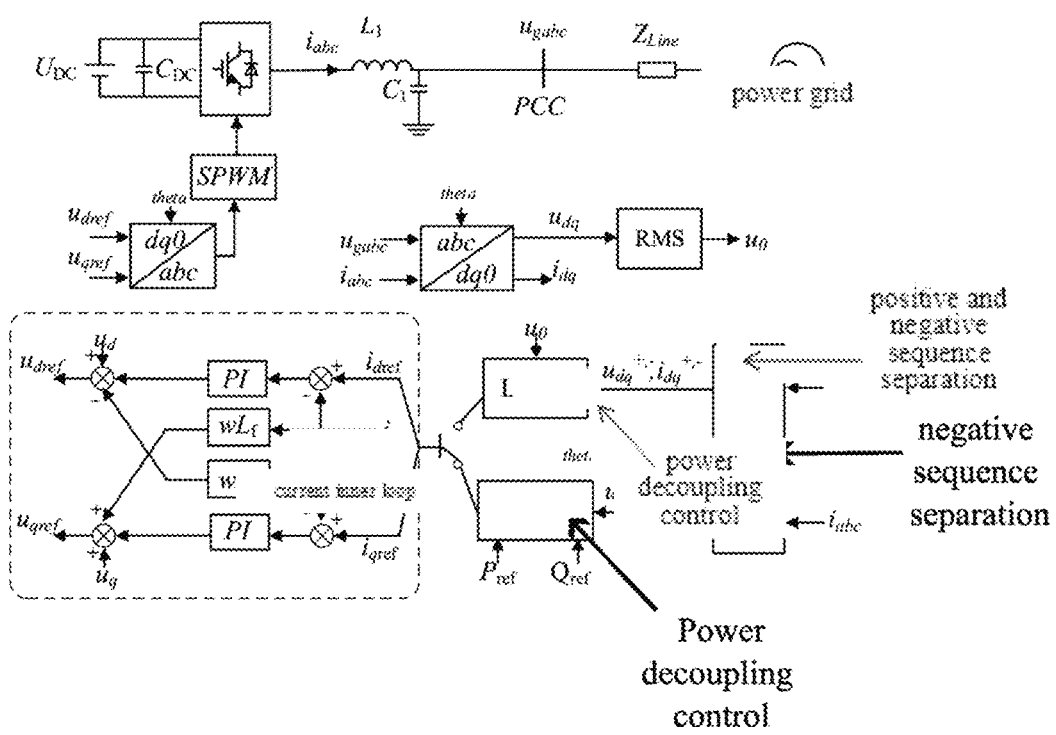
FIG. 4 is a main circuit and control block diagram of a grid-following converter in an embodiment of the present disclosure.

Analyze the Characteristics of Grid-Following Converters and the Low Voltage Ride-Through Control Strategy:

In the embodiment of the present disclosure, a grid-following inverter operated in grid connection is analyzed, it also adopts decoupling control in the dq coordinate system. The control mainly includes components such as outer loop control, inner loop control and phase-locked loop (PLL). Correspondingly, the main circuit and control block diagram of the grid-following inverter are shown in FIG. 4. Among them, the phase-locked loop PLL obtains the amplitude and phase angle of the AC voltage of the power grid by tracking the AC voltage, and then synchronizes with the AC power grid. The outer loop controller adopts PQ decoupling control, and it achieves precise tracking of active and reactive power control by setting the reference value as $P_{ref}$ and Qref, to achieve constant output power. Furthermore, the inner loop controller adopts the current inner loop decoupling control method, which tracks the current reference value through the PI link to achieve direct output current control.

When a power grid has fault, photovoltaic power stations and other new energy sources must have low voltage ride-through capabilities according to national standards. During the fault period, they need to provide a certain amount of reactive power support to the power grid to maintain its stable operation. Therefore, the new energy station using a grid-following converter needs to set the current reference values of the direct axis d and the quadrature axis q of the current inner loop according to the voltage drop degree of the grid connection point after the fault. The low voltage ride-through control strategy adopted at this time is shown in formula (3):

$$\begin{cases} I_{dref} = \min\left(\sqrt{I_{max}^2 - I_{qref}^2},\ \dfrac{2P_{ref}}{3U_0}\right) \\ I_{qref} = \begin{cases} 0 & U_0 \geq 0.9\ \text{p.u.} \\ 1.5*(0.9 - U_0)I_n & 0.2\ \text{p.u.} \leq U_0 \leq 0.9\ \text{p.u.} \\ 1.05I_n & U_0 \leq 0.2\ \text{p.u.} \end{cases} \end{cases} \quad (3)$$

Wherein, $I_{dref}$ and $I_{qref}$ are the current reference values in the main axis d and quadrature axis q coordinate systems respectively; $P_{ref}$ is the active power reference value; $U_0$ is the grid connection point voltage; $I_{max}$ is the maximum limiting current of the grid-following converter; $I_n$ is the rated current; p.u. is the per-unit value.

In addition, affected by the current carrying capacity of power electronic equipment, the PI link of the inner loop controller in the embodiment of the present disclosure is set to limit control, and the maximum current limit amplitude is generally selected as 1.2 to 2 times of the rated current. In addition, when an asymmetric fault occurs in the power grid, it controls the negative sequence current component through the positive and negative sequence separation link to achieve different control objectives such as output current balance or suppressing power fluctuations.

Step 2: establishing an equivalent circuit under a corresponding fault state according to the characteristics of the grid-following and grid-forming converters and the low voltage ride-through control strategy.

First, the embodiment of the present disclosure establishes an equivalent circuit under a fault state according to the characteristics of the grid-following converter and the corresponding low voltage ride-through control strategy.

Specifically, since the grid-following converter can independently construct the voltage amplitude and phase angle, and it is affected by the low voltage ride-through control strategy of the virtual synchronous generator, the internal potential and power angle of the virtual synchronous generator remain constant during the low voltage ride-through process, so the virtual synchronous generator can be equivalent to a voltage source during the fault. In normal operation, the grid-forming converter calculates its corresponding equivalent output impedance based on the voltage relationship between the filter impedance and the inner loop controller, and its value remains constant. During the fault period, due to the introduction of the virtual impedance $R_v+jX_v$ in the control loop, the positive and negative sequence equivalent system impedance of the grid-forming converter is shown in formula (4):

$$\begin{cases} Z_1 = \dfrac{R_f + K_{p2} + \dfrac{K_{i2}}{S} + (R_V + SL_V)m\left(K_{p1} + \dfrac{K_{i1}}{S}\right)\left(K_{p2} + \dfrac{K_{i2}}{S}\right)}{m\left(K_{p1} + \dfrac{K_{i1}}{S}\right)\left(K_{p2} + \dfrac{K_{i2}}{S}\right)} \\ Z_2 = \dfrac{R_f + 2sL_f + K_{p2} + \dfrac{K_{i2}}{S} + (R_V + SL_V)m\left(K_{p1} + \dfrac{K_{i1}}{S}\right)\left(K_{p2} + \dfrac{K_{i2}}{S}\right)}{m\left(K_{p1} + \dfrac{K_{i1}}{S}\right)\left(K_{p2} + \dfrac{K_{i2}}{S}\right)} \end{cases} \quad (4)$$

Where m is the current limiting coefficient; $R_f$ and $L_f$ are the filter parasitic resistance and filter inductance respectively; $k_{p1}$ and $k_{i1}$ are the proportional constant and integral constant of the voltage outer loop respectively; $k_{p2}$ and $k_{i2}$ are the proportional constant and integral constant of the current inner loop respectively; $R_V$ is the virtual resistance; $L_V$ is the virtual inductance.

Figure 5:
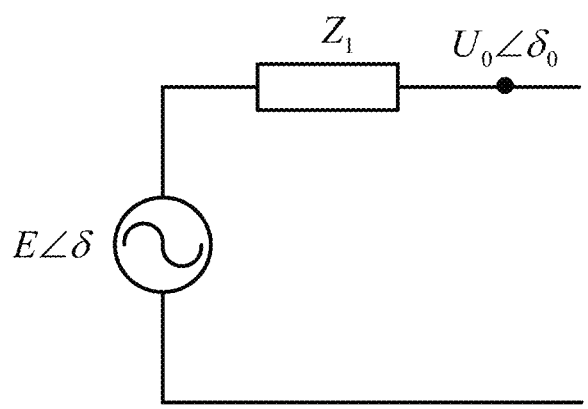
FIG. 5 is a steady-state equivalent circuit of a grid-forming converter in an embodiment of the present disclosure.

According to formula (4), the equivalent impedance of the grid-forming converter is related to the parameters of the PI controller, the limiting coefficient and the filter impedance, and its value remains constant during the steady-state process. Therefore, the grid-forming converter can be equivalent to a voltage source in series with the equivalent output impedance during the fault period, as shown in FIG. 5. Since the virtual internal potential of the virtual synchronous generator is determined by the control strategy of the reactive loop, the steady-state output short-circuit current can be expressed by formula (5) as follows:

$$I = \frac{E\angle\delta - U_0\angle\delta_0}{Z_1}; \qquad (5)$$

Wherein, $E\angle\delta_1$ is the grid-forming internal potential amplitude and phase angle; $U_0\angle\delta_0$ is the voltage amplitude and phase angle at the grid connection point.

Therefore, when there are several inverters in the new energy station connected to the grid in parallel through transformers, the hybrid-connected grid-following and grid-forming wind power system may include m grid-forming converters and n grid-following converters. Among them, the m grid-forming converters can be equivalent to m voltage source $E_s$ nodes with equivalent output impedance $Z_{s1}$ in series. Therefore, when a short circuit fault occurs on the system side, the interaction between new energy sources is ignored, and it is assumed that the same inverter is used in the grid-forming and grid-following new energy stations, and the m voltage source nodes are equivalent to a branch of a voltage source $E_s$ and an equivalent output impedance $Z_1$ ($Z_1=Z_{s1}/m$) in series. Its equivalent voltage source model can be expressed as:

$$\begin{cases} E_s = E_{ref} \\ Z_1 = Z_{s1}/m \end{cases};$$

Where $E_S$ is an output potential of an equivalent voltage source; $E_{ref}$ is an internal potential reference value of the virtual synchronous generator during the fault; $Z_1$ is an equivalent output impedance value; $Z_{s1}$ is an equivalent output impedance value corresponding to a single voltage source node.

Secondly, the embodiment of the present disclosure establishes an equivalent circuit under a fault state according to the characteristics of the grid-following converter and the corresponding low voltage ride-through control strategy.

Figure 6:
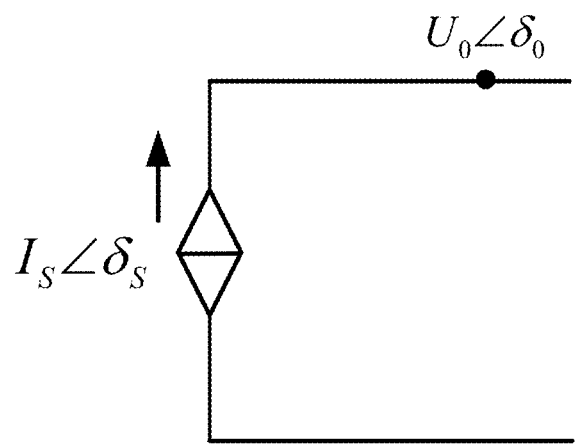
FIG. 6 is a steady-state equivalent circuit of a grid-following converter in an embodiment of the present disclosure.

Specifically, the AC terminal of the grid-following converter simulates the current source characteristics, keeps synchronization with the grid voltage according to the phase-locked loop, and controls the output power by directly controlling the magnitude of the output current. The control adopted in the embodiment of the present disclosure is oriented to the grid connection point voltage, so the amplitude and phase angle of the short-circuit current output by the grid-following converter are affected by the grid connection point voltage. When a fault occurs, the grid-following converter can be equivalent to a current source $I_s$ controlled by the grid connection point voltage, as shown in FIG. 6, and the amplitude and phase angle of its output short-circuit current are expressed by formula (6):

$$\begin{cases} I_s = \sqrt{I_{dref}^2 + I_{qref}^2} = F(U_0) \\ \delta_s = \arctan\sqrt{\frac{I_{qref}}{I_{dref}}} \end{cases}; \qquad (6)$$

When a short circuit fault occurs on the system side, the interaction between new energy sources is ignored, and it is assumed that the same inverter is used in the grid-forming type and grid-following type new energy stations. Among them, n grid-following converters can be equivalent to n current source $I_{s1}$ nodes controlled by the grid connection point voltage. In the equivalent circuit, n current source nodes can be equivalent to a current source $I_s$ ($I_s=nI_{s1}$) branch, and its equivalent current source model can be expressed as:

$$\begin{cases} I_s = nI_{s1} \\ I_{s1} = \sqrt{I_{dref}^2 + I_{qref}^2} = F(U_0) \\ \delta_s = \arctan\sqrt{I_{qref}/I_{dref}} \end{cases};$$

Wherein, $I_S$ is an amplitude of the short-circuit current output by the current source in the equivalent circuit; $I_{S1}$ is an amplitude of the short-circuit current output corresponding to a single current source; $\delta_S$ is a phase angle of the short-circuit current output by the current source in the equivalent circuit; $I_{dref}$ and $I_{qref}$ are current reference values in the direct axis d and quadrature axis q coordinate systems respectively; $U_0$ is the grid connection point voltage.

Step 3: conducting a simplified analysis on the hybrid-connected grid-following and grid-forming wind power system according to the equivalent circuit, and obtaining an equivalent network diagram under the corresponding fault state.

Figure 7:
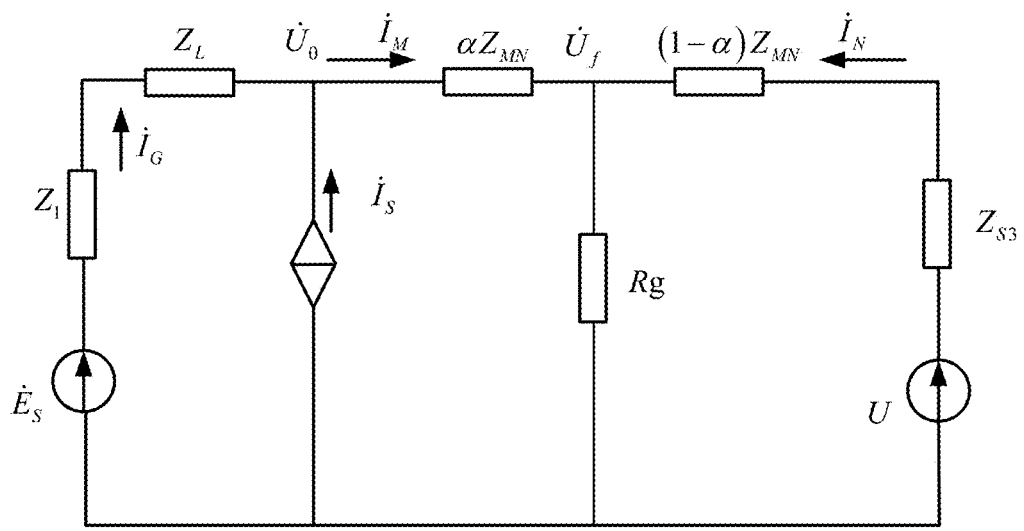
FIG. 7 is an equivalent network diagram when a three-phase fault occurs in hybrid-connected grid-following and grid-forming wind power system in an embodiment of the present disclosure.

First, based on the hybrid-connected grid-following and grid-forming wind power system in FIG. 2, all devices are converted to the same voltage level. When a three-phase short-circuit fault occurs at point f in FIG. 2, it is grounded through the transition resistor $R_g$. According to the above analysis, under the influence of the low voltage ride-through control strategy, the grid-following new energy station can be equivalent to a current source controlled by the grid connection point voltage, and the grid-forming new energy station can be equivalent to a voltage source with series impedance. The system side uses an infinite power source instead. For the convenience of calculation, both transformers use an ideal transformer model. The fault equivalent network diagram of the corresponding hybrid-connected grid-following and grid-forming wind power system is established as shown in FIG. 7. It should be noted that in FIG. 7, $E_s$ is the internal potential of the grid-forming equivalent voltage source; $I_s$ is the output current of the grid-following equivalent current source; $Z_1$ is the grid-forming equivalent output impedance; $I_M$ and $I_N$ are the fault short-circuit currents on both sides of the system respectively; $Z_{MN}$ is the transmission line impedance; a is the fault location coefficient; $R_g$ is the transition resistance; U and $Z_{s3}$ are the internal potential and internal resistance of the system side power source respectively.

Step 4: analyzing the equivalent network diagram to obtain a sub-circuit diagram of each power source excitation acting alone; the power source excitation at least comprises a grid-forming voltage source, a grid-following current source, and a system-side voltage source.

When a three-phase short-circuit fault occurs on the system side, the converter on the new energy source side quickly enters the steady-state stage after the fault due to the short transient process of the converter on the new energy source side. Therefore, the three-phase short-circuit current calculation on both the new energy source side and the system side can be considered as the solution of the periodic component in the steady-state circuit. Due to the difference between the new energy source control structure and the traditional synchronous machine, the amplitude and phase angle of the short-circuit current fed on both sides of the system are very different, resulting in changes in the measurement impedance characteristics of the protection installation in the new energy source system, and the traditional measurement impedance calculation method is no longer applicable.

Figure 8:
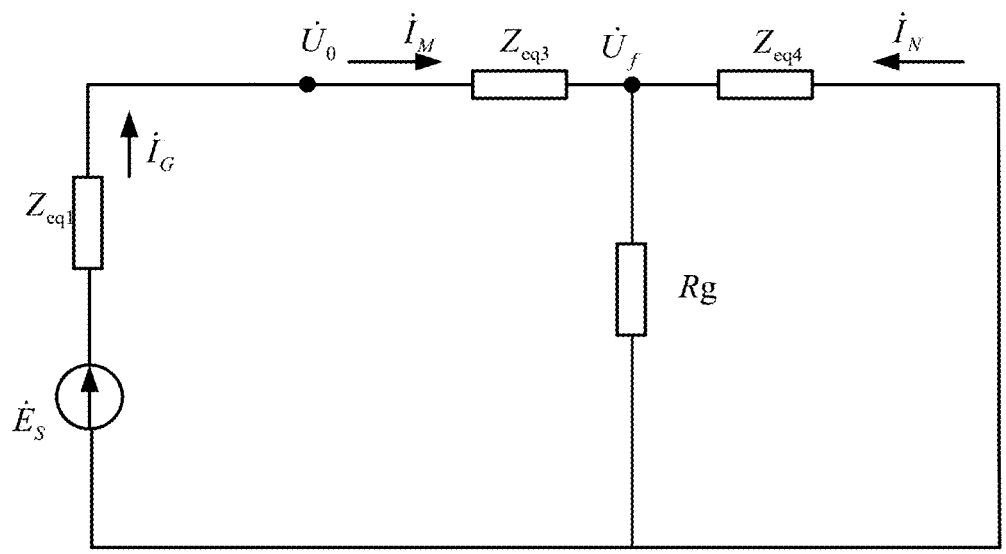
FIG. 8 is an equivalent network diagram when a grid-forming equivalent voltage source acts alone in a hybrid-connected grid-following and grid-forming wind power system in an embodiment of the present disclosure.
Figure 9:
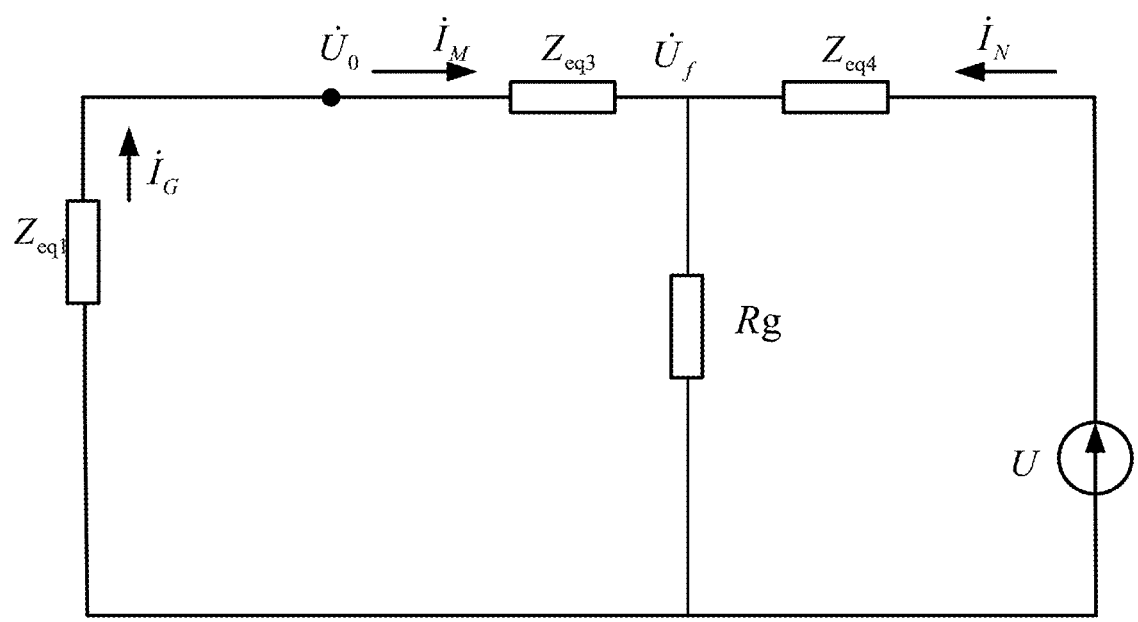
FIG. 9 is an equivalent network diagram when a system-side voltage source acts alone in a hybrid-connected grid-following and grid-forming wind power system in an embodiment of the present disclosure.
Figure 10:
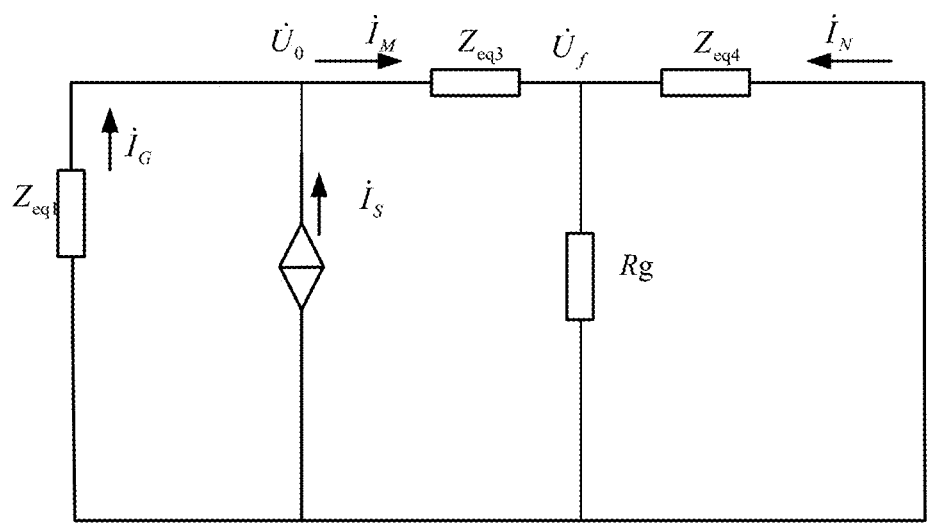
FIG. 10 is an equivalent network diagram when a grid-following equivalent current source acts alone in a hybrid-connected grid-following and grid-forming wind power system in an embodiment of the present disclosure.

As shown in FIG. 7, based on the superposition theorem, the short-circuit current on both sides of the hybrid-connected grid-following and grid-forming wind power system can be considered to be the result of the combined action of the three power sources, namely, the grid-forming voltage source $E_s$, the grid-following current source $I_s$, and the system-side voltage source U. When the grid-forming voltage source $E_s$ acts alone, the system-side voltage source U is short-circuited, and the grid-following current source $I_s$ is open-circuited, the corresponding system equivalent circuit diagram is shown in FIG. 8; when the system-side voltage source U acts alone, the grid-forming voltage source $E_s$ is short-circuited, and the grid-following current source $I_s$ is open-circuited, the corresponding system equivalent circuit diagram is shown in FIG. 9; when the grid-following current source $I_s$ acts alone, the grid-forming voltage source $E_s$ and the system-side voltage source U are short-circuited, the corresponding system equivalent circuit diagram is shown in FIG. 10. Therefore, according to the sub-circuit diagram when the three power sources act alone, the short-circuit current fed from the system side and the new energy source side can be obtained after a three-phase short-circuit fault occurs on the corresponding line when the power source acts alone, and then the superposition solution is performed.

Step 5: analyzing the sub-circuit diagram corresponding to each power source excitation, and obtaining short-circuit currents on a system side and a new energy source side and a grid connection point voltage when each power source excitation acts alone.

Specifically, the embodiments of the present disclosure analyze the individual effects of three power source excitations, namely, the grid-forming voltage source $E_s$, the grid-following current source $I_s$, and the system-side voltage source U:

For the Grid-Forming Voltage Source $E_s$ as Power Source Excitation, Acting Alone:

When only the grid-forming equivalent voltage source acts alone in the power grid, the corresponding system equivalent circuit diagram is shown in FIG. 8. Since the AC system is a weak system, the system side impedance is large, and when the grounding transition resistance is small, the right network $R_g$ and $Z_{eq4}$ are connected in parallel and mainly show the characteristics of transition resistance, while the grid-forming equivalent output impedance $Z_{eq1}$ is large. Therefore, when the grid-forming voltage source acts alone, the corresponding short-circuit currents on the system side and the new energy source side and the grid connection point voltage are as shown in formula (7):

$$\begin{cases} \dot{U}_0 = \frac{Z_{eq3} + Z_{eq4}//R_g}{Z_{eq1} + Z_{eq3} + Z_{eq4}//R_g} \dot{E}_s \approx \frac{Z_{eq3}}{Z_{eq1} + Z_{eq3}} \dot{E}_s \\ \dot{I}_M = \frac{\dot{E}_s}{Z_{eq1} + Z_{eq3} + Z_{eq4}//R_g} \approx \frac{\dot{E}_s}{Z_{eq1} + Z_{eq3}} \\ \dot{I}_N = -\frac{R_g}{R_g + Z_{eq4}} * \frac{\dot{E}_s}{Z_{eq1} + Z_{eq3} + Z_{eq4}//R_g} \approx \frac{R_g}{Z_{eq4} * (Z_{eq1} + Z_{eq3})} \dot{E}_s \end{cases} \quad (7)$$

Where, $U_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{E}_s$ is an internal potential of a grid-forming equivalent voltage source; $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-forming station transmission line impedance; $Z_{MN}$ is a high-voltage side transmission line impedance; $\alpha$ is a fault location coefficient; $R_g$ is a transition resistance; $Z_{s3}$ is an internal resistance of a system side power source. It should be noted that, where $Z_{eq4}//R_g$ indicates that $Z_{eq4}$ and $R_g$ are connected in parallel, and the result is calculated with resistors in parallel.

It can be seen from the above formula (7) that when the grid-forming voltage source acts alone, the grid connection point voltage and the short-circuit current on the new energy source side are mainly affected by the grid-forming internal potential, the grid-forming equivalent output impedance and the fault location, and the system side short-circuit current is mainly affected by the grid-forming internal potential, the grid-forming equivalent output impedance, the system side equivalent impedance and the transition resistance.

For the System Side Voltage Source U as Power Source Excitation, Acting Alone:

When only the system-side voltage source U acts alone in the power grid, the system equivalent circuit diagram is shown in FIG. 9. Since the grounding transition resistance is small and the grid-forming equivalent output impedance $Z_{eq1}$ is large, the left parallel circuit mainly exhibits transition resistance characteristics. At this time, when the grid-following current source acts alone, the short-circuit currents on the system side and the new energy source side and the grid connection point voltage are as shown in formula (8):

$$\begin{cases} \dot{U}_0 = \frac{Z_{eq1} * R_g}{(Z_{eq1}+Z_{eq3})*R_g + (Z_{eq1}+Z_{eq3}+R_g)*Z_{eq1}} \dot{U} \approx \\ \qquad \frac{Z_{eq1} * R_g}{(Z_{eq1}+Z_{eq3})*Z_{eq4}} \dot{U} \\ \dot{I}_N = -\frac{\dot{U}}{Z_{eq4}+(Z_{eq1}+Z_{eq3})//R_g} \approx -\frac{\dot{U}}{Z_{eq4}} \\ \dot{I}_M = \frac{\dot{U}*R_g}{(Z_{eq1}+Z_{eq3}+R_g)*Z_{eq4}+(Z_{eq1}+Z_{eq3})*R_g} \approx \\ \qquad \frac{\dot{U}*R_g}{(Z_{eq1}+Z_{eq3})*Z_{eq4}} \end{cases} \quad (8)$$

Where $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{U}$ is an internal potential of a system side power source; $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source. It should be noted that, $(Z_{eq1}+Z_{eq3})//R_g$ indicates that $Z_{eq1}$, $Z_{eq3}$ and $R_g$ are in parallel connection, and the result is calculated with resistors in parallel.

It can be seen from the above formula (8) that when the system-side voltage source acts alone, the grid connection point voltage and the output short-circuit current of the new energy source side are mainly affected by the system-side voltage, the system-side equivalent impedance, the grid-forming equivalent output impedance and the transition resistance, and the system-side output short-circuit current is mainly affected by the system-side voltage and the system-side equivalent impedance.

For the Grid-Following Current Source $I_s$ as Power Source Excitation, Acting Alone:

When only the grid-following equivalent current source $I_s$ acts alone in the power grid, the system equivalent circuit diagram is shown in FIG. 10. Since the equivalent impedance $Z_{eq4}$ on the system side is large, the parallel circuit on the right mainly exhibits transition resistance characteristics. At this time, when the grid-following current source acts alone, the short-circuit currents on the system side and the new energy source side and the grid connection point voltage are as shown in formula (9):

$$\begin{cases} \dot{U}_0 = \dfrac{Z_{eq1}*(Z_{eq3}+Z_{eq4}//R_g)}{Z_{eq1}+Z_{eq3}+Z_{eq4}//R_g}\dot{I}_s \approx \dfrac{Z_{eq1}Z_{eq3}}{Z_{eq1}+Z_{eq3}}\dot{I}_s \\ \dot{I}_N = \dfrac{R_g}{R_g+Z_{eq3}}*\dfrac{Z_{eq1}}{Z_{eq1}+Z_{eq3}+Z_{eq4}//R_g}\dot{I}_s \approx -\dfrac{Z_{eq1}Z_{eq3}}{Z_{eq1}+Z_{eq3}}\dot{I}_s \\ \dot{I}_M = \dfrac{Z_{eq1}}{Z_{eq1}+Z_{eq3}+Z_{eq4}//R_g}\dot{I}_s \approx \dfrac{Z_{eq1}}{Z_{eq1}+Z_{eq3}}\dot{I}_s \end{cases} \quad (9)$$

Where $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{I}_S$ is an output current of the grid-following equivalent current source; $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source. It should be noted that, $Z_{eq4}//R_g$ indicates that $Z_{eq4}$ and $R_g$ are connected in parallel, and the result is calculated with resistors in parallel.

It can be seen from the above formula that at this time, the grid connection point voltage and the output short-circuit current on the new energy source side are mainly affected by the grid-forming equivalent output impedance, the fault location and the photovoltaic output current. The system-side output short-circuit current is mainly affected by the grid-forming equivalent output impedance, the system-side equivalent impedance, the grid-following output current and the transition resistance.

Step 6: superimposing short-circuit currents on the system side and the new energy source side corresponding to various power source excitations respectively, to obtain total short-circuit current on the system side and the new energy source side in the hybrid-connected grid-following and grid-forming wind power system; superimposing grid connection point voltages corresponding to various power source excitations, to obtain a total grid connection point voltage of the hybrid-connected grid-following and grid-forming wind power system.

Specifically, according to the superposition theorem, the total short-circuit current on the system side and the new energy source side and the total voltage at the grid connection point in the hybrid-connected grid-following and grid-forming wind power system can be obtained by superimposing the related quantities of the three excitations acting alone. Therefore, in the embodiment of the present disclosure, the total short-circuit current on the system side and the new energy source side and the total voltage at the grid connection point in the hybrid-connected grid-following and grid-forming wind power system obtained by superimposing the excitations of various power sources are shown in formula (10):

$$\begin{cases} \dot{U}_0 = \dfrac{Z_{eq3}Z_{eq4}\dot{E}_s + Z_{eq1}R_g\dot{U} + Z_{eq1}Z_{eq3}Z_{eq4}\dot{I}_s}{(Z_{eq1}+Z_{eq3})*Z_{eq4}} \\ \dot{I}_M = \dfrac{Z_{eq4}\dot{E}_s + R_g\dot{U} + Z_{eq1}Z_{eq4}\dot{I}_s}{(Z_{eq1}+Z_{eq3})*Z_{eq4}} \\ \dot{I}_N = -\dfrac{R_g\dot{E}_s + (Z_{eq1}+Z_{eq3})\dot{U} + R_gZ_{eq1}\dot{I}_s}{Z_{eq4}(Z_{eq1}+Z_{eq3})} \end{cases} \quad (10)$$

Wherein, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{E}_s$ is an internal potential of a grid-forming equivalent voltage source; $\dot{I}_s$ is an output current of the grid-following equivalent current source; $\dot{U}$ is an internal potential of a system side power source; $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source.

Step 7: obtaining a measurement impedance at a protection installation location on the new energy source side by calculating, based on the total short-circuit current on the system side and the new energy source side in the hybrid-connected grid-following and grid-forming wind power system.

Specifically, the measurement impedance at the protection installation location on the new energy source side in the embodiment of the present disclosure can be expressed as shown in formula (11):

$$Z_m = \dfrac{\dot{U}_m}{\dot{I}_m} = Z_{eq3} + \dfrac{\dot{I}_M+\dot{I}_N}{\dot{I}_M}R_g = \quad (11)$$

$$Z_{eq3} + \Delta Z = Z_{eq3} + R_g + \dfrac{R_g\dot{E}_S + (Z_{eq1}+Z_{eq3})\dot{U} + R_gZ_{eq1}\dot{I}_S}{Z_{eq4}\dot{E}_S + R_g\dot{U} + Z_{eq1}Z_{eq4}\dot{I}_S}R_g;$$

Wherein, $U_m$ is a measurement voltage at the protection installation location on the new energy source side; $I_m$ is a measurement current at the protection installation location on the new energy source side; $I_M$ is a fault short-circuit current on the new energy source side; $I_N$ is a fault short-circuit current on the system side; $E_s$ is an internal potential of the grid-forming equivalent voltage source; $I_S$ is an output current of the grid-following equivalent current source; U is an internal potential of the system side power source; $Z_{eq1}=Z_1+Z_L$, $Z_{eq3}=\alpha Z_{MN}$, $Z_{eq4}=(1-\alpha)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\Delta Z$ is an additional impedance; $\alpha$ is a fault location coefficient; $R_g$ is a transition resistance; $Z_{s3}$ is an internal resistance of the system side power source.

It should be understood that the measurement impedance solved in the embodiment of the present disclosure mainly includes two parts: fault impedance $Z_{eq3}$ and additional impedance $\Delta Z$. Due to different types of new energy source access systems, the additional impedance characteristics vary greatly. It can be seen from the above formula (11) that the additional impedance $\Delta Z$ is mainly related to the equivalent internal potential of grid-forming type, the equivalent output impedance of grid-forming type, the equivalent output current of grid-following type, the internal potential and equivalent impedance of the system side, and the fault location. The system is affected by different low voltage ride-through control strategies, which may cause the additional impedance to show the characteristics of resistance and capacitance or resistance and inductance, so that the protection cannot correctly measure the actual fault impedance, thereby causing the distance protection to refuse to operate or malfunction. Therefore, the embodiment of the present disclosure can analyze the characteristics of the measurement impedance after the hybrid-connected new energy source system fails according to the above impedance calculation process, accurately calculate the measurement impedance value at the protection installation location of the new energy source side after the fault, and reasonably design the fault strategy and parameter ratio of the grid-following and grid-forming new energy source, so as to provide a basis for the study of the applicability of distance protection of the hybrid-connected grid-following and grid-forming wind power system and ensure the safe and stable operation of the new energy source system.

Furthermore, in order to verify the effectiveness of the method for calculating fault measurement impedance of the hybrid-connected grid-following and grid-forming wind power system proposed above, the embodiment of the present disclosure builds a simulation model in the PSCAD simulation platform. The overall structure diagram of the simulation model is shown in FIG. 2. The grid-following station adopts a wind farm station or a photovoltaic power station, and the grid-forming new energy source adopts virtual synchronous generator control. The two stations are connected to the transmission line through a transformer and connected to the power grid through a 220 KV line. The capacity of the two new energy stations is 75 MW, the total length of the transmission line is 80 km, and the line impedance parameter is (0.076+0.338j) Ω/km. The main parameters of the two types of inverters are shown in Tables 1 and 2:

TABLE 1

Parameters of grid-forming inverter

| Parameter | Value | Parameter | Value |
|---|---|---|---|
| Rated Voltage $U_N$/kV | 0.38 | Rated Capacity $S_N$/kW | 75 |
| Filter Inductance $L_1$/mH | 0.08 | Active Power Loop Inertia J | 0.05 |

TABLE 1-continued

Parameters of grid-forming inverter

| Parameter | Value | Parameter | Value |
|---|---|---|---|
| Filter Capacitance $C_1$/uF | 30 | Active Power Loop Damping Coefficient $D_p$ | 5 |
| Parasitic Resistance $R_1$/ohm | 0.05 | Reactive Power Loop Integral Coefficient K | 8 |

TABLE 2

Parameters of grid-following inverter

| Parameter | Value | Parameter | Value |
|---|---|---|---|
| Rated Voltage $U_N$/kV | 0.38 | Rated Capacity $S_N$/kW | 75 |
| Filter Inductance $L_1$/mH | 0.13 | PWM Gain/$k_{pwm}$ | 1 |
| Filter Capacitance $C_1$/uF | 2750 | Inner Loop Proportional Coefficient $k_p$ | 0.45 |
| Parasitic Resistance $R_1$/ohm | 0.167 | Inner Loop Integral Coefficient $k_i$ | 100 |

All inverters in the new energy station of the embodiment of the present disclosure adopt the fault ride-through strategy adopted by the above-mentioned grid-following and grid-forming converters, and set a three-phase short-circuit fault at point f on the transmission line, and ground it through the transition resistor $R_g$. Since the influence of the transition resistor on the additional impedance may cause the distance protection to operate incorrectly, the embodiment of the present disclosure simulates the fault states of different grounding transition resistors to obtain the output short-circuit current and measurement impedance of the system side and the new energy source side, and calculates the output short-circuit current and measurement impedance of the system side and the new energy source side based on the above calculation method. Taking the fault at the midpoint of the line as an example, the embodiment of the present disclosure simulates and calculates the output short-circuit current and measurement impedance of the system side and the new energy source side under the fault states of different grounding transition resistors, and the calculated values and simulation values are shown in Table 3. By comparing the results of Table 3, it can be seen that the calculation method proposed in the embodiment of the present disclosure can accurately and effectively calculate the output short-circuit current value and measurement impedance value of the system side and the new energy source side of the hybrid-connected grid-following and grid-forming wind power system, and in the case of grounding through a small transition resistor, the amplitude error of the measurement impedance and the simulation result obtained by calculation does not exceed 3%, and the angle error does not exceed 1 degree.

TABLE 3

Comparison of simulation and theoretical values of short-circuit current and measurement impedance on both sides under different transition resistances

| Transition Resistance / Ω | $I_M$ / A | | $I_N$ / A | | $Z_m$ / Ω | | |
|---|---|---|---|---|---|---|---|
| | Calculated Value | Simulated Value | Calculated Value | Simulated Value | Calculated Value | Simulated Value | Magnitude Error / % |
| 2 | 712.49 ∠ −116.87 | 710.20 ∠ −113.08 | 1217.67 ∠ −179.03 | 1209.13 ∠ −177.93 | 12.419 ∠ 57.70 | 12.329 ∠ 57.98 | 0.73 |
| 3 | 704.21 ∠ −126.03 | 706.47 ∠ −123.13 | 1220.714 ∠ −179.22 | 1206.89 ∠ −177.40 | 13.091 ∠ 45.621 | 13.066 ∠ 45.955 | 0.19 |
| 4 | 672.454 ∠ −136.03 | 677.561 ∠ −131.81 | 1221.95 ∠ −179.43 | 1204.02 ∠ −176.85 | 14.983 ∠ 34.681 | 14.811 ∠ 35.106 | 1.16 |
| 6 | 602.54 ∠ −148.367 | 609.18 ∠ −142.54 | 1222.3 ∠ −179.79 | 1201.9 ∠ −175.8 | 20.711 ∠ 20.263 | 20.253 ∠ 20.343 | 2.26 |

Furthermore, the embodiment of the present disclosure performs simulation and calculation for different fault locations while keeping the ground transition resistance $R_g=3\Omega$ unchanged, and obtains the output short-circuit current and measurement impedance on the system side and the new energy source side, and the calculated values and simulation values are shown in Table 4. By comparing the results, it can be seen that the calculation method proposed in the embodiment of the present disclosure can accurately and effectively calculate the output short-circuit current value and measurement impedance value on the system side and the new energy source side of the hybrid-connected grid-following and grid-forming wind power system, and the amplitude error of the calculated measurement impedance does not exceed 3%, and the angle error does not exceed 1 degree.

TABLE 4

Comparison of simulation and theoretical values of short-circuit current and measurement impedance on both sides at different fault locations

| Fault Location / km | $I_M$ / A | | $I_N$ / A | | $Z_m$ / Ω | | |
|---|---|---|---|---|---|---|---|
| | Calculated Value | Simulated Value | Calculated Value | Simulated Value | Calculated Value | Simulated Value | Magnitude Error / % |
| 20 | 647.498 ∠ −150.02 | 645.97 ∠ −140.09 | 1163.95 ∠ −178.80 | 1160.11 ∠ −176.88 | 9.572 ∠ 21.983 | 9.550 ∠ 21.821 | 0.23 |
| 40 | 704.21 ∠ −126.03 | 706.47 ∠ −123.13 | 1220.714 ∠ −179.22 | 1206.89 ∠ −177.40 | 13.091 ∠ 45.621 | 13.066 ∠ 45.955 | 0.19 |
| 60 | 696.59 ∠ −115.60 | 697.94 ∠ −117.87 | 1280.32 ∠ −179.69 | 1258.34 ∠ −177.93 | 18.279 ∠ 56.944 | 18.543 ∠ 56.874 | 1.44 |

Based on the above results, it can be seen that the fault measurement impedance calculation method for the hybrid-connected grid-following and grid-forming wind power system proposed in the embodiment of the present disclosure can accurately calculate the short-circuit current on the system side and the new energy source side after the hybrid-connected grid-following and grid-forming wind power system fails/has fault, and can further solve the measurement impedance value at the protection installation. The result can accurately reflect the actual measurement impedance value at the protection installation on the new energy source side, and has a very small result error with the actual result, which ensures the setting calculation of the protection, can accurately reflect the fault characteristic information of the hybrid-connected AC system, and provide a basis for the study of the applicability of distance protection of the hybrid-connected grid-following and grid-forming wind power system, which is of great significance for ensuring the safe and stable operation of the new energy source system.

Figure 11:
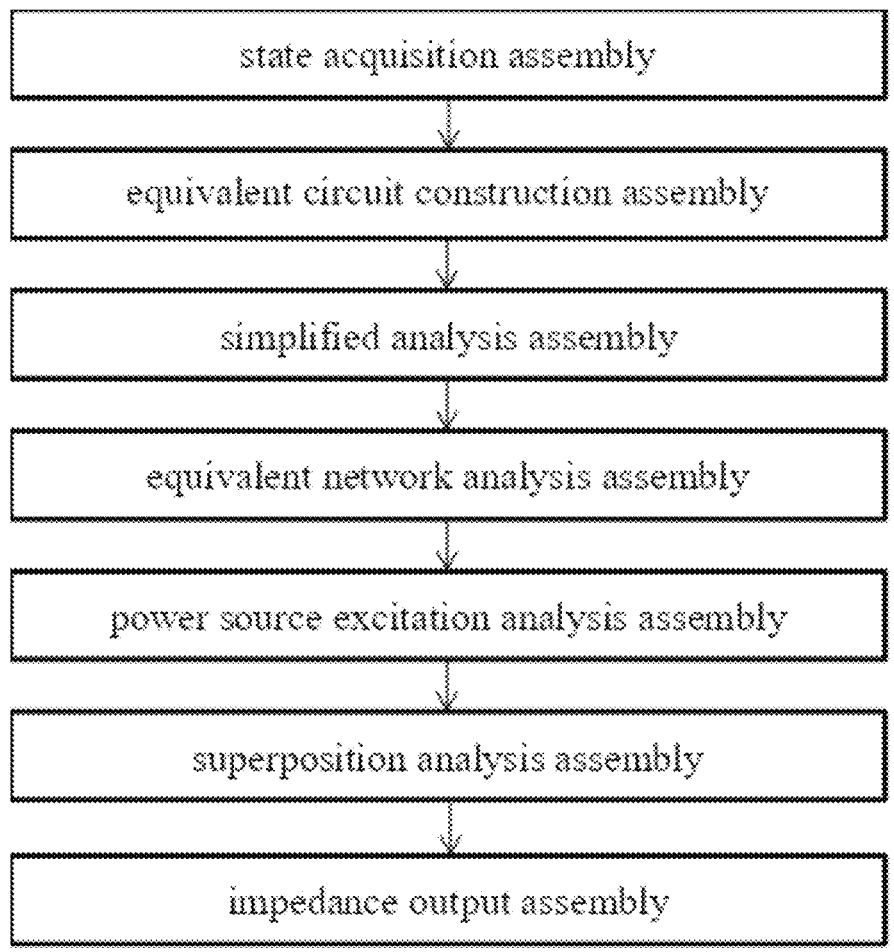
FIG. 11 is a schematic structural view of a measurement impedance calculation device of a hybrid-connected grid-following and grid-forming wind power system in an embodiment of the present disclosure.

In addition, as shown in FIG. 11, the embodiment of the present disclosure further discloses a device for calculating fault measurement impedance of a hybrid-connected grid-following and grid-forming wind power system, comprising:

a state acquisition assembly, configured for obtaining characteristics of the grid-following and grid-forming converters in a power grid and a corresponding low voltage ride-through control strategy under a fault state;

an equivalent circuit construction assembly, configured for establishing an equivalent circuit under a corresponding fault state according to the characteristics of the grid-following and grid-forming converters and the low voltage ride-through control strategy;

a simplified analysis assembly, configured for conducting a simplified analysis on the hybrid-connected grid-following and grid-forming wind power system according to the equivalent circuit, and obtaining an equivalent network diagram under the corresponding fault state;

an equivalent network analysis assembly, configured for analyzing the equivalent network diagram to obtain a sub-circuit diagram of each power source excitation acting alone; the power source excitation at least comprises a grid-forming voltage source, a grid-following current source, and a system-side voltage source;

a power source excitation analysis assembly, configured for analyzing the sub-circuit diagram corresponding to each power source excitation, and obtaining short-circuit currents on a system side and a new energy source side and a grid connection point voltage when each power source excitation acts alone;

a superposition analysis assembly, configured superimposing short-circuit currents on the system side and the new energy source side corresponding to various power source excitations respectively, to obtain total short-circuit current on the system side and the new energy source side in the hybrid-connected grid-following and grid-forming wind power system; and superimposing grid connection point voltages corresponding to various power source excitations, to obtain a total grid connection point voltage of the hybrid-connected grid-following and grid-forming wind power system; and an impedance output assembly, configured for obtaining a measurement impedance at a protection installation location on the new energy source side by calculating, based on the total short-circuit current on the system side and the new energy source side in the hybrid-connected grid-following and grid-forming wind power system.

The device provided in the embodiment of the present disclosure can carry out every process achieved by the method embodiment described in FIG. 1, and will not be described again here to avoid repetition.

Figure 12:
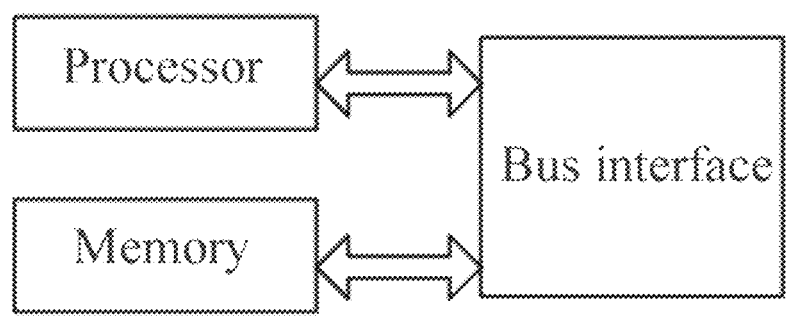
FIG. 12 is a schematic structural view of an electronic device in an embodiment of the present disclosure.

As shown in FIG. 12, an embodiment of the present disclosure also provides an electronic device, including a processor and a memory, a program or instruction stored in the memory and executable on the processor, which, when executed by the processor, implements the various processes of the method embodiment shown in FIG. 1 and can achieve the same technical effect. To avoid repetition, it will not be repeated here.

The embodiment of the present disclosure also provides a readable storage medium, on which a program or instruction is stored. When the program or instruction is executed by a processor, each process of the method embodiment described in FIG. 1 is implemented, and the same technical effect can be achieved. To avoid repetition, it will not be repeated here.

The embodiment of the present disclosure also provides a computer program product, including computer instructions. When the computer instructions are executed by a processor, the various processes of the method embodiment described in FIG. 1 above are implemented, and the same technical effect can be achieved. To avoid repetition, they are not described again here.

It should be understood that "one embodiment" or "an embodiment" mentioned throughout the specification means that specific features, structures or characteristics related to the embodiment are included in at least one embodiment of the present disclosure. Therefore, "in one embodiment" or "in an embodiment" appearing throughout the specification does not necessarily refer to the same embodiment. In addition, these specific features, structures or characteristics can be combined in one or more embodiments in any suitable manner. It should be understood that in the various embodiments of the present disclosure, the size of the serial number of the above-mentioned processes/steps does not mean the order of execution. The execution order of each process should be determined by its function and internal logic, and should not constitute any limitation on the implementation process of the embodiments of the present disclosure. The serial numbers of the embodiments of the present disclosure are for description only and do not represent the advantages and disadvantages of the embodiments.

It should be noted that, in this article, the terms "include", "comprise" or any other variations thereof are intended to cover non-exclusive inclusion, so that a process, method, article or device including a series of elements includes not only those elements, but also other elements not explicitly listed, or also includes elements inherent to such process, method, article or device. In the absence of further restrictions, an element defined by the sentence "comprises a . . . " does not exclude the existence of other identical elements in the process, method, article or device including the element.

In the several embodiments provided in the present disclosure, it should be understood that the disclosed devices and methods can be implemented in other ways. The device embodiments described above are only schematic. For example, the division of the units is only a logical function division. There may be other division methods in actual implementation, such as: multiple units or components can be combined, or can be integrated into another device, or some features can be ignored or not executed. In addition, the coupling, direct coupling, or communication connection between the components shown or discussed can be through some interfaces, and the indirect coupling or communication connection of the devices or units can be electrical, mechanical or other forms.

The units described above as separate components may or may not be physically separated, and the components displayed as units may or may not be physical units; they may be located in one place or distributed on multiple network units; some or all of the units may be selected according to actual needs to achieve the purpose of the present embodiment.

In addition, all functional units in the embodiments of the present disclosure may be integrated into one processing unit, or each unit may be separately configured as a unit, or two or more units may be integrated into one unit; the above-mentioned integrated units may be implemented in the form of hardware or in the form of hardware plus software functional units.

A person of ordinary skill in the art can understand that all or part of the steps of implementing the above method embodiment can be completed by hardware related to program instructions, and the aforementioned program can be stored in a computer-readable storage medium. When the program is executed, it executes the steps of the above method embodiment; and the aforementioned storage medium includes: a mobile storage device, a read-only memory (ROM), a magnetic disk or an optical disk, and other media that can store program codes.

Alternatively, if the above-mentioned integrated unit of the present disclosure is implemented in the form of a software functional assembly and sold or used as an independent product, it can also be stored in a computer-readable storage medium. Based on this understanding, the technical solution of the embodiment of the present disclosure can essentially be embodied in the form of a software product or in other words, the part that contributes to the prior art can be embodied in the form of a software product, and the computer software product is stored in a storage medium, including a number of instructions for a device (which can be a terminal or a platform, etc.) to execute all or part of the methods described in each embodiment of the present disclosure. The aforementioned storage medium includes: various media that can store program codes, such as mobile storage devices, ROMs, magnetic disks or optical disks.

The above only represents optional embodiments of the present disclosure. It should be pointed out that for those skilled in the art, several improvements and modifications can be made without departing from the technical principles of the present disclosure. These improvements and modifications should fall within the scope of protection of the present disclosure.

What is claimed is:

1. A method for calculating fault measurement impedance of a hybrid-connected grid-following and grid-forming wind power system, wherein the hybrid-connected grid-following and grid-forming wind power system comprises at least a grid-following converter and a grid-forming converter, and the method comprises following steps:
   obtaining characteristics of the grid-following and grid-forming converters in a power grid and a corresponding low voltage ride-through control strategy under a fault state;
   establishing an equivalent circuit under a corresponding fault state according to the characteristics of the grid-following and grid-forming converters and the low voltage ride-through control strategy;
   conducting a simplified analysis on the hybrid-connected grid-following and grid-forming wind power system according to the equivalent circuit, and obtaining an equivalent network diagram under the corresponding fault state;
   analyzing the equivalent network diagram to obtain a sub-circuit diagram of each power source excitation acting alone; the power source excitation at least comprises a grid-forming voltage source, a grid-following current source, and a system-side voltage source;
   analyzing the sub-circuit diagram corresponding to each power source excitation, and obtaining short-circuit currents on a system side and a new energy source side and a grid connection point voltage when each power source excitation acts alone;
   superimposing short-circuit currents on the system side and the new energy source side corresponding to various power source excitations respectively, to obtain total short-circuit current on the system side and the new energy source side in the hybrid-connected grid-following and grid-forming wind power system; superimposing grid connection point voltages corresponding to various power source excitations, to obtain a total grid connection point voltage of the hybrid-connected grid-following and grid-forming wind power system; and
   obtaining a measurement impedance at a protection installation location on the new energy source side by calculating, based on the total short-circuit current on the system side and the new energy source side in the hybrid-connected grid-following and grid-forming wind power system;

$$Z_m = \frac{\dot{U}_m}{\dot{I}_m} = Z_{eq3} + \frac{\dot{I}_M + \dot{I}_N}{\dot{I}_M} R_g =$$

$$Z_{eq3} + \Delta Z = Z_{eq3} + R_g + \frac{R_g \dot{E}_S + (Z_{eq1} + Z_{eq3})\dot{U} + R_g Z_{eq1} \dot{I}_S}{Z_{eq4} \dot{E}_S + R_S \dot{U} + Z_{eq1} Z_{eq4} \dot{I}_S} R_g;$$

where, $\dot{U}_m$ is a measurement voltage at the protection installation location on the new energy source side; $\dot{I}_m$ is a measurement current at the protection installation location on the new energy source side; $\dot{I}_M$ is a fault short-circuit current on the new energy source side; $\dot{I}_N$ is a fault short-circuit current on the system side; $\dot{E}_s$ is an internal potential of the grid-forming equivalent voltage source; $\dot{I}_S$ is an output current of the grid-following equivalent current source; $\dot{U}$ is an internal potential of the system side power source; $Z_{eq1}=Z_1+Z_L$, $Z_{eq3}=aZ_{MN}$, $Z_{eq4}=(1-a)Z_{MN}+Z_{s3}$; $Z_1$ is a grid-forming equivalent output impedance; $Z_L$ is a grid-following station transmission line impedance; $Z_{MN}$ is a high-voltage side transmission line impedance; DZ is an additional impedance; $\alpha$ is a fault location coefficient; $R_g$ is a transition resistance; $Z_{s3}$ is an internal resistance of the system side power source.

2. The method according to claim 1, wherein the corresponding low voltage ride-through control strategy under the fault state comprises a low voltage ride-through control strategy of the grid-forming converter; the low voltage ride-through control strategy of the grid-forming converter comprises steps:
   adjusting an active power reference value of a virtual synchronous generator from $P_{ref}$ to $P_e$, and keeping a power angle of the virtual synchronous generator stable during a fault period, wherein a change Dd of the power angle of the virtual synchronous generator during the fault period is:

$$\Delta\delta = \int \Delta\omega dt = \frac{P_{ref} - P_e}{D\omega_n}\left(t + \frac{J}{D}e^{\frac{D}{J}t} - \frac{J}{D}\right);$$

by switching a virtual internal potential amplitude reference value and a reactive power reference value of the virtual synchronous generator, limiting the short-circuit current and providing a reactive support to the hybrid-connected grid-following and grid-forming wind power system, wherein the virtual internal potential amplitude reference value of the virtual synchronous generator switched during the fault period is:

$$E_{ref} = \frac{-a \pm \sqrt{a^2 - 4b}}{2};$$

wherein a is a first calculated intermediate value, and a is obtained by a first intermediate value calculation formula, and the first intermediate value calculation formula is:

$$a = -\frac{u_{gf}(E_0^2 + U_{g0}^2 - |Z_{eq}|^2 I_0^2)}{E_0 U_{g0}};$$

wherein b is a second calculated intermediate value, and b is obtained by a second intermediate value calculation formula, and the second intermediate value calculation formula is:

$$b = u_{gf}^2 - |Z_{eq}|^2 I_{gf}^2;$$

wherein, Dw is a rate of change of virtual rotation angular velocity of the virtual synchronous generator; $P_{ref}$ is an active power reference value of the virtual synchronous generator; $P_e$ is an output active power of the virtual synchronous generator; D is a virtual damping coefficient; J is a virtual moment of inertia; $w_n$ is a rated value of grid frequency; $E_0$ is an internal potential of the virtual synchronous generator before fault; $U_{g0}$ is a grid voltage before fault; $I_0$ is a rated output current of the virtual synchronous generator; $E_{ref}$ is an internal potential reference value of the virtual synchronous generator during fault; $u_{gf}$ is a voltage amplitude of fault phase of the grid; $I_{gf}$ is a fault steady-state current limit threshold of the virtual synchronous generator; $Z_{eq}$ is an equivalent total impedance of a virtual synchronous generator grid-connected system;

wherein when a fault occurs, a virtual impedance link is put into operation to perform short-circuit current limiting control and increase an equivalent output impedance of the virtual synchronous generator to suppress a short-circuit instantaneous large current impact of the virtual synchronous generator during the fault.

3. The method according to claim 1, wherein the corresponding low voltage ride-through control strategy under the fault state comprises a low voltage ride-through control strategy of the grid-following converter; the low voltage ride-through control strategy of the grid-following converter comprises steps:

according to a drop degree of the grid connection point voltage after the fault, setting current reference values of a direct axis d and a quadrature axis q of a current inner loop as follows:

$$\begin{cases} I_{dref} = \min\left(\sqrt{I_{max}^2 - I_{qref}^2}, \dfrac{2P_{ref}}{3U_0}\right) \\ I_{qref} = \begin{cases} 0 & U_0 \geq 0.9 \text{ p.u.} \\ 1.5*(0.9 - U_0)I_n & 0.2 \text{ p.u.} \leq U_0 \leq 0.9 \text{ p.u.} \\ 1.05\, I_n & U_0 \leq 0.2 \text{ p.u.} \end{cases} \end{cases} ;$$

wherein, $I_{dref}$ is a current reference value in a direct axis d coordinate system; $I_{qref}$ is a current reference value in a quadrature axis q coordinate system; $P_{ref}$ is an active power reference value; $U_0$ is a grid connection point voltage; $I_{max}$ is a maximum limiting current of the grid-following converter; $I_n$ is a rated current; p.u. is a per unit value;

according to a current carrying capacity of power electronic equipment in the hybrid-connected grid-following and grid-forming wind power system, setting a limiting control for a PI link of a current inner loop controller, wherein the maximum current limiting amplitude is 1.2~2 times of the rated current.

4. The method according to claim 1, wherein the hybrid-connected grid-following and grid-forming wind power system comprises m grid-forming converters and n grid-following converters; when a fault occurs, the m grid-forming converters are equivalent to m voltage source $E_s$ nodes with series equivalent output impedance $Z_{s1}$, and the n grid-following converters are equivalent to n current source $I_{s1}$ nodes controlled by the grid connection point voltage;

when the equivalent circuit process under the corresponding fault state is established, the m voltage source nodes are equivalent to a branch of a voltage source $E_s$ and an equivalent output impedance $Z_1$ in series, and an equivalent voltage source model of the corresponding branch is:

$$\begin{cases} E_s = E_{ref} \\ Z_1 = Z_{s1}/m \end{cases} ;$$

where $E_S$ is an output potential of an equivalent voltage source; $E_{ref}$ is an internal potential reference value of the virtual synchronous generator during the fault; $Z_1$ is an equivalent output impedance value; $Z_{s1}$ is an equivalent output impedance value corresponding to a single voltage source node;

wherein n current source nodes are equivalent to a current source $I_s$ branch, and the equivalent current source model of the corresponding branch is:

$$\begin{cases} I_s = nI_{s1} \\ I_{s1} = \sqrt{I_{dref}^2 + I_{qref}^2} = F(U_0) \\ \delta_s = \arctan\sqrt{I_{qref}/I_{dref}} \end{cases} ;$$

wherein $I_S$ is an amplitude of the short-circuit current output by the current source in the equivalent circuit; $I_{S1}$ is an amplitude of the short-circuit current output corresponding to a single current source; $d_S$ is a phase angle of the short-circuit current output by the current source in the equivalent circuit; $I_{dref}$ and $I_{qref}$ are current reference values in the direct axis d and quadrature axis q coordinate systems respectively; $U_0$ is the grid connection point voltage.

5. The method according to claim 1, wherein the short-circuit currents on the system side and the new energy source side and the grid connection point voltage when the grid-forming voltage source acts alone, are:

$$\begin{cases} \dot{U}_0 = \dfrac{Z_{eq3} + Z_{eq4}//R_g}{Z_{eq1} + Z_{eq3} + Z_{eq4}//R_g}\dot{E}_s \approx \dfrac{Z_{eq3}}{Z_{eq1} + Z_{eq3}}\dot{E}_s \\ \dot{I}_M = \dfrac{\dot{E}_s}{Z_{eq1} + Z_{eq3} + Z_{eq4}//R_g} \approx \dfrac{\dot{E}_s}{Z_{eq1} + Z_{eq3}} \\ \dot{I}_N = -\dfrac{R_g}{R_g + Z_{eq1}} * \dfrac{\dot{E}_s}{Z_{eq1} + Z_{eq3} + Z_{eq4}//R_g} \approx -\dfrac{R_g}{Z_{eq4} + (Z_{eq1} + Z_{eq3})}\dot{E}_s \end{cases} ;$$

where, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{E}_s$ is an internal potential of a grid-forming equivalent voltage source; $Z_{eq1}=Z_1+Z_L$, $Z_{eq3}=aZ_{MN}$, $Z_{eq4}=(1-a)Z_{MN}+Z_{s3}$; Z is a grid-forming equivalent output impedance; $Z_L$ is a grid-forming station transmission line impedance; $Z_{MN}$ is a high-voltage side transmission line impedance; $\alpha$ is a fault location coefficient; $R_g$ is a transition resistance; $Z_{s3}$ is an internal resistance of a system side power source $Z_{eq4}//R_g$ is a total resistance value calculated after $Z_{eq4}$ is in a parallel connection with $R_g$.

6. The method according to claim 5, wherein the short-circuit currents on the system side and the new energy source side and the grid connection point voltage when the grid-following voltage source acts alone, are:

$$\begin{cases} \dot{U}_0 = \frac{Z_{eq1} * (Z_{eq3} + Z_{eq4}//R_g)}{Z_{eq1} + Z_{eq3} + Z_{eq4}//R_g} \dot{I}_s \approx \frac{Z_{eq1}Z_{eq3}}{Z_{eq1} + Z_{eq3}} \dot{I}_s \\ \dot{I}_N = \frac{R_g}{R_g + Z_{eq3}} * \frac{Z_{eq1}}{Z_{eq1} + Z_{eq3} + Z_{eq4}//R_g} \dot{I}_s \approx -\frac{R_g Z_{eq1}}{Z_{eq4}(Z_{eq1} + Z_{eq3})} \dot{I}_s \\ \dot{I}_M = \frac{Z_{eq1}}{Z_{eq1} + Z_{eq3} + Z_{eq4}//R_g} \dot{I}_s \approx \frac{Z_{eq1}}{Z_{eq1} + Z_{eq3}} \dot{I}_s \end{cases}$$

wherein, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{I}_S$ is an output current of the grid-following equivalent current source; $Z_{eq1}=Z_1+Z_L$, $Z_{eq3}=aZ_{MN}$, $Z_{eq4}=(1-a)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source; $Z_{eq4}//R_g$ is a total resistance value calculated after $Z_{eq4}$ is in a parallel connection with $R_g$.

7. The method according to claim 6, wherein the short-circuit currents on the system side and the new energy source side and the grid connection point voltage when the system-side voltage source acts alone, are:

$$\begin{cases} \dot{U}_0 = \frac{Z_{eq1} * R_g}{(Z_{eq1} + Z_{eq3}) * R_g + (Z_{eq1} + Z_{eq3} + R_g) * Z_{eq4}} \dot{U} \approx \frac{Z_{eq1} * R_g}{(Z_{eq1} + Z_{eq3}) * Z_{eq4}} \dot{U} \\ \dot{I}_N = \frac{\dot{U}}{Z_{eq4} + (Z_{eq1} + Z_{eq3})//R_g} \approx -\frac{\dot{U}}{Z_{eq4}} \\ \dot{I}_M = \frac{\dot{U} * R_g}{(Z_{eq1} + Z_{eq3} + R_g) * Z_{eq4} + (Z_{eq1} + Z_{eq3}) * R_g} \approx \frac{\dot{U} * R_g}{(Z_{eq1} + Z_{eq3}) * Z_{eq4}} \end{cases}$$

wherein, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{U}$ is an internal potential of a system side power source; $Z_{eq1}=Z_1+Z_L$, $Z_{eq3}=aZ_{MN}$, $Z_{eq4}=(1-a)Z_{MN}+Z_{s3}$; $Z_1$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source; $(Z_{eq1}+Z_{eq3})//R_g$ is a total resistance value calculated after $Z_{eq1}$ and $Z_{eq3}$ are connected in parallel with $R_g$.

8. The method according to claim 7, wherein the total short-circuit current on the system side and the new energy source side and the total grid connection point voltage in the of the hybrid-connected grid-following and grid-forming wind power system, obtained by superimposing the various power source excitations, are:

$$\begin{cases} \dot{U}_0 = \frac{Z_{eq3}Z_{eq4}\dot{E}_s + Z_{eq1}R_g\dot{U} + Z_{eq1}Z_{eq3}Z_{eq4}\dot{I}_s}{(Z_{eq1} + Z_{eq3}) * Z_{eq4}} \\ \dot{I}_N = \frac{Z_{eq4}\dot{E}_s + R_g\dot{U} + Z_{eq1}Z_{eq4}\dot{I}_s}{(Z_{eq1} + Z_{eq3}) * Z_{eq4}} \\ \dot{I}_M = -\frac{R_g\dot{E}_s + (Z_{eq1} + Z_{eq3})\dot{U} + R_g Z_{eq1}\dot{I}_s}{Z_{eq4}(Z_{eq1} + Z_{eq3})} \end{cases}$$

wherein, $\dot{U}_0$ is a grid connection point voltage of the hybrid-connected grid-following and grid-forming wind power system; $\dot{I}_M$ is a fault short-circuit current on the new energy source side; $\dot{I}_N$ is a fault short-circuit current on the system side; $\dot{E}_S$ is an internal potential of a grid-forming equivalent voltage source; $\dot{I}_S$ is an output current of the grid-following equivalent current source; $\dot{U}$ is an internal potential of a system side power source; $Z_{eq1}=Z_1+Z_L$, $Z_{eq3}=aZ_{MN}$, $Z_{eq4}=(1-a)Z_{MN}+Z_{s3}$; $Z$ is a grid-forming equivalent output impedance; $Z_L$ is a grid-following station transmission line impedance; $Z_{MN}$ is a high-voltage side transmission line impedance; $\alpha$ is a fault location coefficient; $R_g$ is a transition resistance; $Z_{s3}$ is an internal resistance of the system side power source.

9. A device for calculating fault measurement impedance of a hybrid-connected grid-following and grid-forming wind power system, comprising:
a state acquisition assembly, configured for obtaining characteristics of the grid-following and grid-forming converters in a power grid and a corresponding low voltage ride-through control strategy under a fault state;
an equivalent circuit construction assembly, configured for establishing an equivalent circuit under a corresponding fault state according to the characteristics of the grid-following and grid-forming converters and the low voltage ride-through control strategy;
a simplified analysis assembly, configured for conducting a simplified analysis on the hybrid-connected grid-following and grid-forming wind power system according to the equivalent circuit, and obtaining an equivalent network diagram under the corresponding fault state;
an equivalent network analysis assembly, configured for analyzing the equivalent network diagram to obtain a sub-circuit diagram of each power source excitation acting alone; the power source excitation at least comprises a grid-forming voltage source, a grid-following current source, and a system-side voltage source;
a power source excitation analysis assembly, configured for analyzing the sub-circuit diagram corresponding to each power source excitation, and obtaining short-circuit currents on a system side and a new energy source side and a grid connection point voltage when each power source excitation acts alone;
a superposition analysis assembly, configured superimposing short-circuit currents on the system side and the new energy source side corresponding to various power source excitations respectively, to obtain total short-circuit current on the system side and the new energy source side in the hybrid-connected grid-following and grid-forming wind power system; and
superimposing grid connection point voltages corresponding to various power source excitations, to obtain a total grid connection point voltage of the hybrid-connected grid-following and grid-forming wind power system; and an impedance output assembly, configured for obtaining a measurement impedance at a protection installation location on the new energy source side by calculating, based on the total short-circuit current on the system side and the new energy source side in the hybrid-connected grid-following and grid-forming wind power system;

$$Z_m = \frac{\dot{U}_m}{\dot{I}_m} = Z_{eq3} + \frac{\dot{I}_M + \dot{I}_N}{\dot{I}_M} R_g =$$

$$Z_{eq3} + \Delta Z = Z_{eq3} + R_g + \frac{R_g \dot{E}_s + (Z_{eq1} + Z_{eq3})\dot{U} + R_g Z_{eq1} \dot{I}_s}{Z_{eq4} \dot{E}_s + R_g \dot{U} + Z_{eq1} Z_{eq4} \dot{I}_s} R_g;$$

where, $\dot{U}_m$ is a measurement voltage at the protection installation location on the new energy source side; $\dot{I}_m$ is a measurement current at the protection installation location on the new energy source side; $\dot{I}_M$ is a fault short-circuit current on the new energy source side; $\dot{I}_N$ is a fault short-circuit current on the system side; $\dot{E}_S$ is an internal potential of the grid-forming equivalent voltage source; $\dot{I}_S$ is an output current of the grid-following equivalent current source; $\dot{U}$ is an internal potential of the system side power source; $Z_{eq1}=Z_1+Z_L$, $Z_{eq3}=aZ_{MN}$, $Z_{eq4}=(1-a)Z_{MN}+Z_{s3}$; $Z_1$ is a grid-forming equivalent output impedance; Z is a grid-following station transmission line impedance; $Z_{MN}$ is a high-voltage side transmission line impedance; DZ is an additional impedance; $\alpha$ is a fault location coefficient; $R_g$ is a transition resistance; $Z_{s3}$ is an internal resistance of the system side power source.

* * * * *